United States Patent
Mochida et al.

(10) Patent No.: US 8,363,124 B2
(45) Date of Patent: Jan. 29, 2013

(54) EXPOSURE CONTROL APPARATUS AND EXPOSURE CONTROL PROGRAM FOR VEHICLE-MOUNTED ELECTRONIC CAMERA

(75) Inventors: Kentaro Mochida, Chiryu (JP); Takayuki Kimura, Kariya (JP); Kenta Hoki, Hekinan (JP)

(73) Assignee: DENSO CORPORATION, Kariya (JP)

( * ) Notice: Subject to any disclaimer, the term of this patent is extended or adjusted under 35 U.S.C. 154(b) by 551 days.

(21) Appl. No.: 12/318,145

(22) Filed: Dec. 22, 2008

(65) Prior Publication Data

US 2009/0251563 A1  Oct. 8, 2009

(30) Foreign Application Priority Data

Dec. 26, 2007 (JP) ................................. 2007-334934

(51) Int. Cl.
*H04N 5/235* (2006.01)
(52) U.S. Cl. .................................................. 348/229.1
(58) Field of Classification Search .................. 348/148, 348/149, 362–368, 221.1, 229.1, 255; 382/270–273
See application file for complete search history.

(56) References Cited

U.S. PATENT DOCUMENTS

| 5,255,044 | A | * | 10/1993 | Ishiguro | ............................ | 396/95 |
| 2,898,986 | A | | 10/1996 | Homma et al. | | |
| 5,565,918 | A | * | 10/1996 | Homma et al. | ............... | 348/364 |
| 5,703,644 | A | | 12/1997 | Mori et al. | | |
| 7,251,056 | B2 | | 7/2007 | Matsushima | | |
| 7,365,779 | B2 | * | 4/2008 | Yamada | ..................... | 348/230.1 |
| 2001/0010540 | A1 | | 8/2001 | Ogura et al. | | |
| 2005/0083428 | A1 | | 4/2005 | Ohkawara | | |
| 2008/0024606 | A1 | | 1/2008 | Kawasaki | | |
| 2008/0094471 | A1 | | 4/2008 | Usami et al. | | |
| 2009/0097745 | A1 | * | 4/2009 | Kim et al. | ..................... | 382/167 |

FOREIGN PATENT DOCUMENTS

| JP | A-UM-S60-011475 | 4/1985 |
| JP | A-1236780 | 9/1989 |
| JP | H06-253208 | 9/1994 |
| JP | H06-253298 | 9/1994 |
| JP | 2005-148308 | 6/2005 |

OTHER PUBLICATIONS

Office Action dated Sep. 8, 2009 from the Japan Patent Office for corresponding patent application No. 2007-334934 (English translation enclosed).
Office Action dated Apr. 5, 2011 from the U.S. Patent Office in related U.S. Appl. No. 12/318,146.
Office Action dated on Sep. 21, 2011 from the U.S. Patent Office in related U.S. Appl. No. 12/318,144.
Final Office Action dated on Sep. 29, 2011 from the U.S. Patent Office in related U.S. Appl. No. 12/318,146.
Notice of Allowance mailed on Dec. 9, 2011 from the U.S. Patent Office in related U.S. Appl. No. 12/318,144.

* cited by examiner

*Primary Examiner* — Chieh M Fan
*Assistant Examiner* — Akshay Trehan
(74) *Attorney, Agent, or Firm* — Posz Law Group, PLC

(57) ABSTRACT

In an exposure control apparatus for a vehicle-installed camera which captures images of an external scene ahead of the vehicle as respective arrays of picture elements, highest-brightness and lowest-brightness picture elements of each image are excluded from processing for measuring the brightness of a region in the scene ahead of the vehicle, thereby enabling stable measurement of brightness with reduced effects of incident light from oncoming vehicle headlights, dark patches on the road surface, etc.

8 Claims, 15 Drawing Sheets

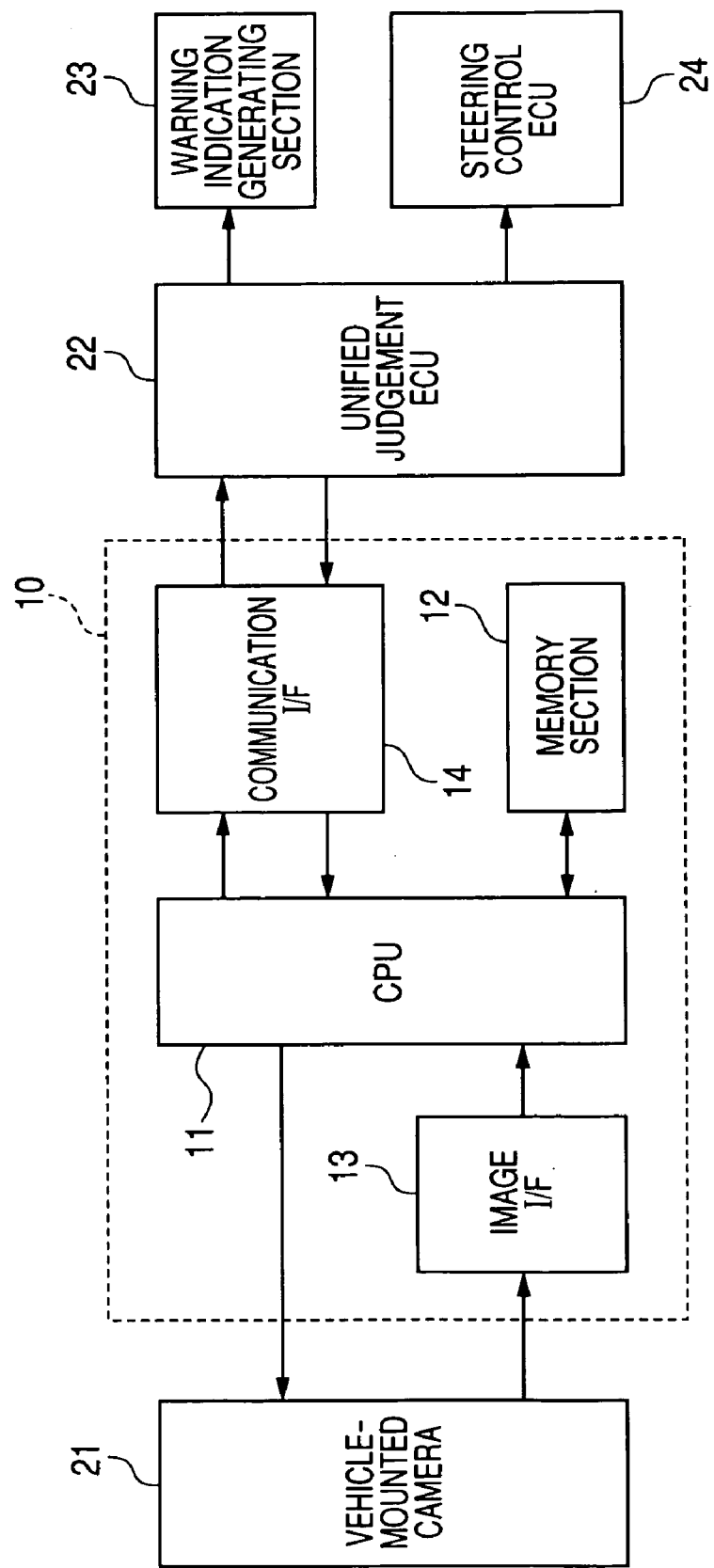

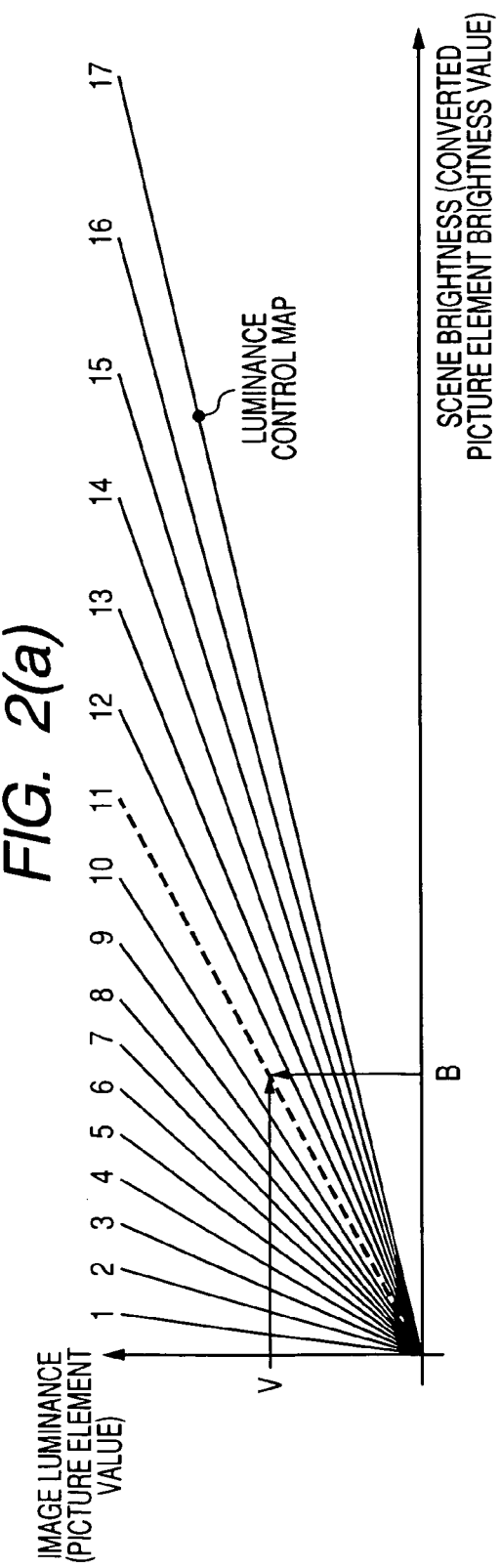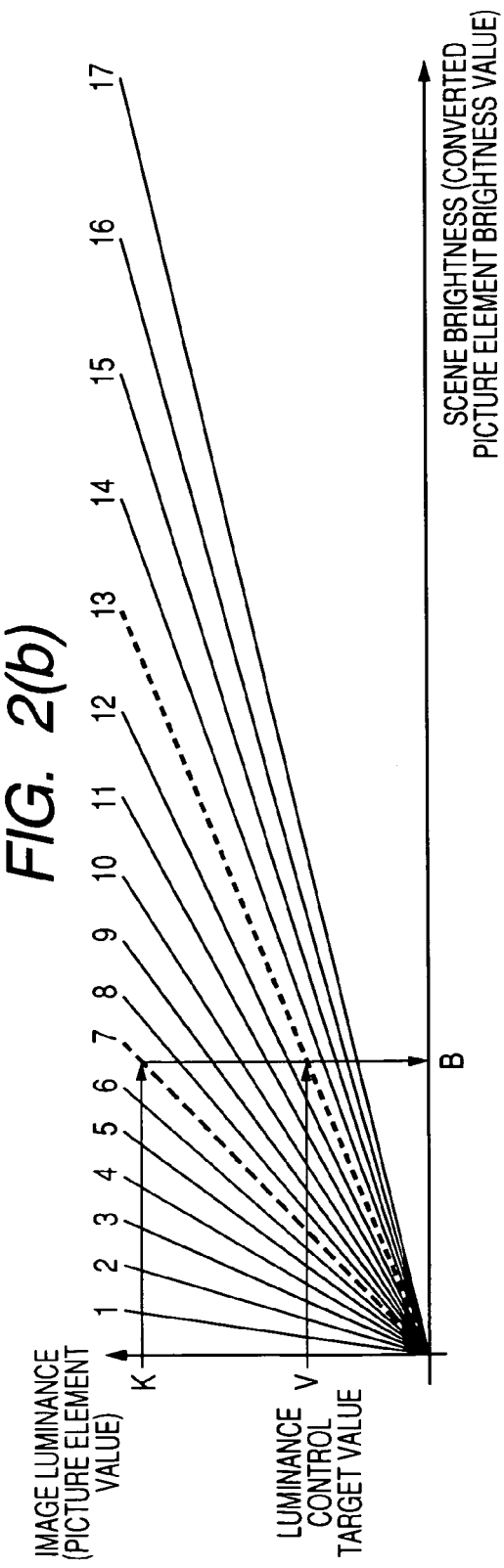

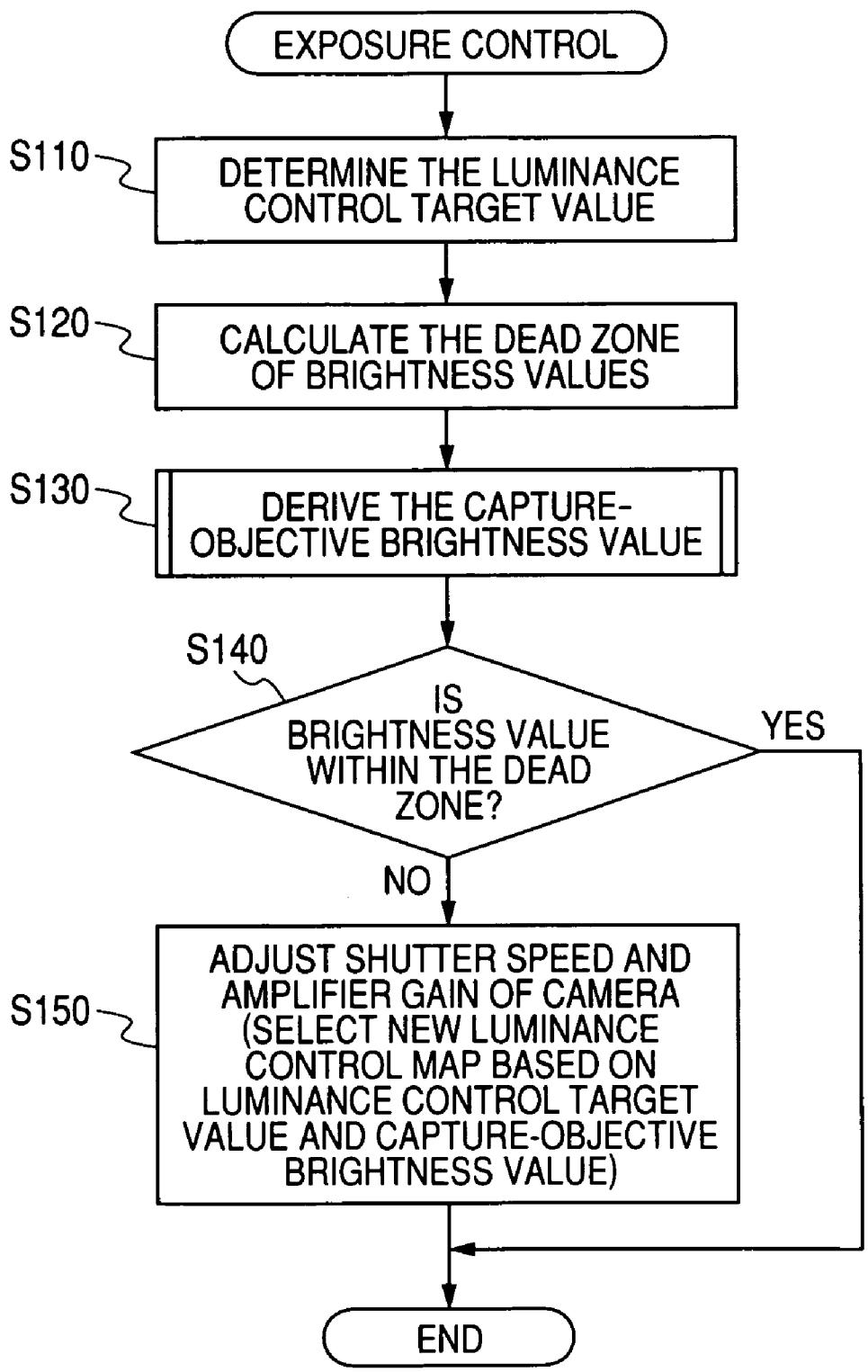

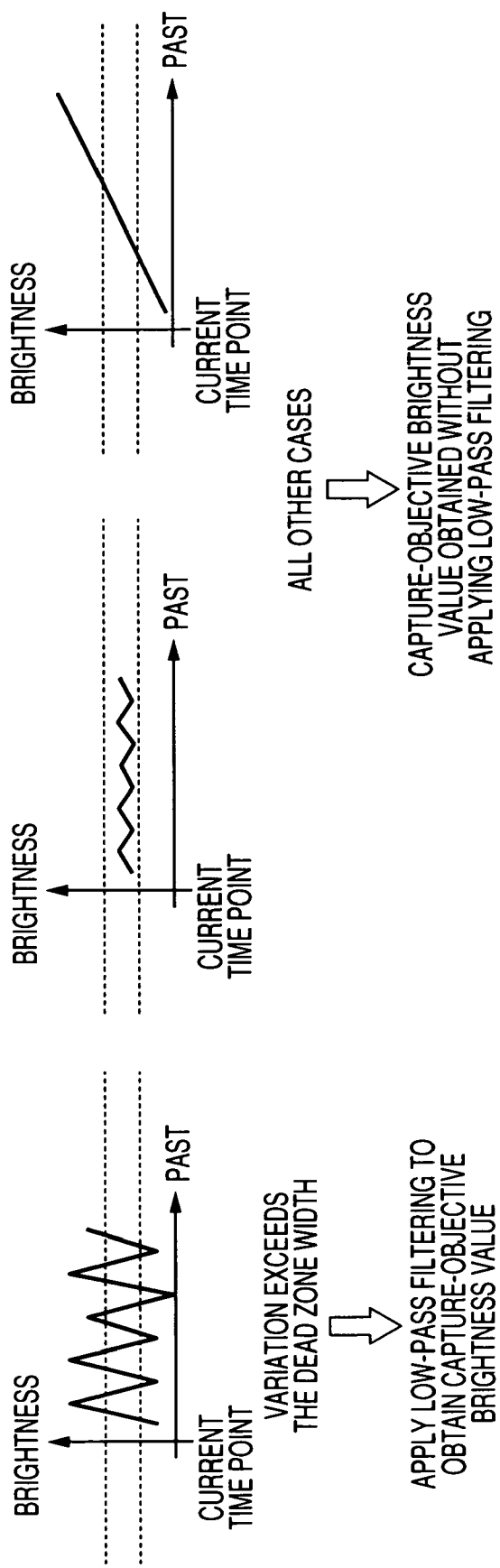

EXPOSURE CONTROL APPARATUS AND EXPOSURE CONTROL PROGRAM FOR VEHICLE-MOUNTED ELECTRONIC CAMERA

CROSS-REFERENCE TO RELATED APPLICATIONS

This application is based on and incorporates herein by reference Japanese Patent Application No. 2007-334934 filed on Dec. 26, 2007. This application is also related to U.S. application Ser. No. 12/318,146, entitled EXPOSURE CONTROL APPARATUS AND EXPOSURE CONTROL PROGRAM FOR VEHICLE-MOUNTED ELECTRONIC CAMERA, and Ser. No. 12/318,144 entitled EXPOSURE CONTROL APPARATUS AND EXPOSURE CONTROL PROGRAM FOR VEHICLE-MOUNTED ELECTRONIC CAMERA, both simultaneously filed on Dec. 22, 2008 with the present application.

BACKGROUND OF THE INVENTION

1. Field of Application

The present invention relates to an exposure control apparatus, for exposure control of an electronic camera which captures successive images of a region ahead of a vehicle in which the camera is installed.

2. Description of Related Art

In recent years, vehicle-installed electronic cameras (in general, digital video cameras, referred to in the following simply as cameras) have come into use for capturing images of a region located ahead of the vehicle, with technology having been developed whereby the captured images (sets of digital data expressing respective captured images) are processed for such functions as recognition of white lines formed on the road surface or detection of objects such as a preceding vehicle. The processing results can be used to generate warning indications to a vehicle driver, control driving of the vehicle, etc.

With such technology, it is important that the exposure of the camera be appropriately controlled in accordance with brightness of the scene which is being captured by the camera, in order to maximize the reliability of recognizing white lines on the road surface or solid objects such as preceding vehicles, etc., based on the images captured by the camera.

A vehicle having such a camera and processing apparatus installed therein, which are being described, is referred to in the following as the "local vehicle".

As described for example in Japanese patent first publication No. 6-25320B (designated as reference document 1 herein), a method of using such camera images for recognition of white lines on the road surface has been proposed whereby two laterally extending sections are selected within each image. A first one of these sections is positioned to contain a part of the (imaged) road surface that is currently close to the local vehicle, and the data obtained from the first section, in each of successive captured images, are utilized for recognition of white lines on the road surface. The second section is positioned to contain a part of the road surface that is farther ahead of the local vehicle (i.e., is in an upper part of each captured image). Hence the second section contains a region which will be subjected to recognition processing at a future time point, determined by the speed at which the local vehicle is travelling. Designating the average brightness levels of the first and second sections as b0 and b1 respectively, the difference between these is obtained for each of successive captured images. If the difference is found to exceed a predetermined threshold value, then the camera exposure which will be applied in capturing the next image is adjusted based on the brightness value b1 (i.e., by changing the camera shutter speed, etc).

With the above method of reference document 1, if for example the road surface ahead of the vehicle changes between a brightly sunlit condition and a shade condition, the camera exposure can be appropriately controlled for each of successive captured images, i.e., such as to prevent the abrupt change in scene brightness from affecting the reliability of white line detection.

However in an actual road environment, the brightness of the road surface will not generally change between a sunlit condition and a shade condition (i.e., with the change extending uniformly across the road surface) in such a simple manner. Instead, the changes can take various forms. For that reason, it is difficult to reliably control the camera exposure by such a method under actual operating conditions.

It has also been proposed, for example in Japanese patent first publication No. 2005-148308 (designated as reference document 2 herein) to use an exposure control apparatus whereby the brightness of the road surface ahead of a local vehicle is measured for use in camera exposure control, while excluding the effects of white lines (traffic lane markers) formed on the road surface. A video camera on the vehicle obtains successive captured images of a region directly ahead of the vehicle, which contains these white lines. A plurality of areas within each captured image are selectively examined to measure their respective brightness levels, with these areas being predetermined as corresponding to areas of the road surface that are normally outside the white lines when the vehicle is travelling along the center of a traffic lane. The respective brightness values of these areas are measured, and the exposure of the vehicle-mounted camera is controlled based on the results.

Diagram (a) in FIG. 17 shows an example of such brightness measurement regions, i.e., areas used for measurement of the brightness level of the road surface. Such a method is intended to enable the brightness of the road surface to be more reliably measured, without the measurement being affected by fluctuations in brightness due to presence of white line portions in the captured images. However as illustrated in diagram (b) of FIG. 17, if the local vehicle moves laterally, then portions of the white lines may come within the brightness measurement regions. This results in fluctuations in the capture-objective brightness values that are derived from successive captured images. Due to these fluctuations, appropriate exposure control may not be possible.

If it is attempted to set the positions and configurations of the brightness measurement regions such that the white lines will never come within them, then the freedom of determining the locations and shapes of these brightness measurement regions becomes severely limited. Hence, due to such factors as variations in regulations concerning vehicle width, positions of white lines used to define traffic lanes, etc., in various different countries, it may be difficult to establish appropriate brightness measurement regions, so that an excessive amount of work is required in design, etc., with such a method.

SUMMARY OF THE INVENTION

It is an objective of the present invention to overcome the above problems by providing an exposure control apparatus whereby appropriate control of camera exposure can be achieved while enabling greater freedom of selecting a brightness measurement region (i.e., an image region from which a measured brightness value is obtained, for use in exposure control).

To achieve the above objectives, from a first aspect. The invention provides an exposure control apparatus for performing exposure control (i.e., adjusting the exposure condition by changing the shutter speed, etc., when necessary) of an electronic digital camera such as a digital video camera that is installed on a vehicle for periodically capturing images of an external scene ahead of the vehicle as respective arrays of picture elements having respective luminance values. The apparatus is configured to convert said luminance values to corresponding brightness values of said external scene in accordance with a predetermined relationship between the current exposure condition of said camera, said luminance values and said brightness values. The apparatus basically comprises extraction circuitry, exclusion circuitry and measurement circuitry. The extraction circuitry extracts from each captured image a plurality of picture elements constituting a brightness measurement region, while the exclusion circuitry excludes a set of highest-brightness picture elements from said brightness measurement region. The measurement circuitry measures a capture-objective brightness value of said image, based upon respective brightness values of remaining picture elements of said brightness measurement region following said exclusion (e.g., in the simplest case, with the capture-objective brightness value being the average of the luminance values of these remaining picture elements), and the exposure control circuitry adjusts said camera exposure condition in accordance with the measured capture-objective brightness value.

Such an exposure control apparatus may also be configured to similarly exclude a set of lowest-brightness picture elements from the brightness measurement region.

Here, the term "set of highest-brightness picture elements" signifies at least the highest-brightness picture element of a specific part of the brightness measurement region, and (when the set contains plural values) one or more picture elements having brightness values respectively extending up to that of the highest-brightness value. Similarly, the term "set of lowest-brightness picture elements" signifies at least the lowest-brightness picture element of a specific part of the brightness measurement region, and (when the set contains plural values) one or more picture elements having brightness values respectively extending down to that of the lowest-brightness value.

With such an exposure control apparatus it is possible to achieve more reliable measurement of brightness of a specific portion of the scene ahead of the vehicle, since the effects of regions of unusually high brightness (due to light reflected from white lines on an asphalt road surface, light from headlamps of oncoming vehicles, etc.) or unusually low brightness (due to light being absorbed by repaired parts of a concrete road surface, etc.) can be excluded.

For example as illustrated in FIG. 18, in which the broken-line rectangle 33 represents a brightness measurement region of a captured image, it becomes possible with the present invention to reliably measure brightness values of only those portions of the road surface (in the brightness measurement region) that are outside the white lines 30, so that the measured brightness is determined only by the road surface. As can be understood from comparison with the prior art of diagram (a) of FIG. 17 above, this provides greater freedom in determining the size, shape and location of the brightness measurement region. In addition, as can be understood from comparison with diagram (b) of FIG. 17 above, the present invention provides greater stability of exposure control (brightness measurement) with respect to lateral displacement of the vehicle within its traffic lane, i.e., the measured scene brightness is not affected by changes in the extent to which areas such as the white lines come within the brightness measurement region, or by changes in the positions of such bright areas within the brightness measurement region.

More reliable and stable exposure control can thereby be achieved.

When both a set of highest-brightness picture elements and a set of lowest-brightness picture elements are excluded, these may consist of respectively different numbers of picture elements. The excluded set of highest-brightness picture elements and excluded set of lowest-brightness picture elements are preferably formed of respective fixedly predetermined numbers of picture elements. This is advantageous in that brightness measurement processing is always applied to an identical number of picture elements of an image.

However it would also be possible to predetermine a maximum threshold value of brightness, and exclude those picture elements which exceed that threshold value. Similarly, it would be possible to predetermine a minimum threshold value of brightness, and to exclude those picture elements having respective brightness values which are below that minimum threshold value. However in that case, the brightness measurement processing would be applied to varying numbers of picture elements in successive images, which is a disadvantage.

The picture elements of the brightness measurement region of an image are preferably extracted in units of picture lines (horizontal rows of picture elements) from a captured image, with the exclusion circuit performing the above-described exclusion respectively separately for each of these picture lines. This ensures that excessively high-brightness and excessively low-brightness picture elements can be excluded from the brightness measurement region in a balanced manner.

Specifically, the exclusion means is preferably configured to successively increase respective numbers of picture elements constituting the first set of picture elements and the second set of picture elements, for each of the picture lines constituting the brightness measurement region, in accordance with increasing closeness of the picture lines to the vehicle in which the apparatus is installed (i.e., increasing closeness of the external region represented by the picture line). The reason for this is that, the greater the distance from the vehicle, the more difficult it becomes to distinguish white lines, etc., from the normal road surface. Hence, relatively large number of picture elements are excluded from picture lines only when these correspond to regions that are close to the vehicle in which the apparatus is installed. Preferably, in the case of the most distant region, no picture elements are excluded from the corresponding picture lines.

From another aspect, the measurement circuitry is preferably configured to process each of the picture lines of the brightness measurement region by:

(a) calculating and storing an average brightness value of the line, thereby obtaining successive average values (i.e., each obtained for that picture line position) from respective sequentially captured images, and (b) performing time-axis filtering (averaging) of a plurality of these average values which have been previously obtained for the picture line, to obtain a smoothed value which is less affected by variations between the successively obtained average values.

The measurement circuitry then derives a capture-objective brightness value based upon these smoothed average values that are calculated for each of the picture lines constituting the brightness measurement region. Preferably, the strength of the time-axis filtering (i.e., degree of smoothing) which is applied to the average values obtained for each picture line is increased in accordance with increasing distance of the external region which is represented by that line.

The reason for increasing the strength of the time-axis filtering in accordance with increasing distance is that sources of varying-intensity bright light (such as headlamps of oncoming vehicles, etc., which may intermittently enter the brightness measurement region) tend to correspond to distant regions in an image. Hence, by increasing the strength of the time-axis filtering (i.e., degree of smoothing) that is applied to the successive average values obtained for each picture line, in accordance with the distance corresponding to the picture line, greater stability of exposure control can be achieved.

Preferably, in the case of the closest region to the local vehicle, no time-axis filtering is applied to the average values obtained for the corresponding picture lines.

An exposure control apparatus according to the present invention can be advantageously implemented by processing performed in accordance with a program that is executed by a computer.

BRIEF DESCRIPTION OF THE DRAWINGS

FIG. 1 is a general block diagram of a vehicle system incorporating an embodiment of an exposure control apparatus;

FIG. 2 shows examples of exposure control maps for use with the embodiment;

FIG. 3 is a flow diagram of exposure control processing executed by the embodiment;

FIG. 14 shows diagrams illustrating an operation of judging whether or not a capture-objective brightness value for use in exposure control is obtained by low-pass filter processing of successively obtained values;

DESCRIPTION OF PREFERRED EMBODIMENTS

Figure 4A:
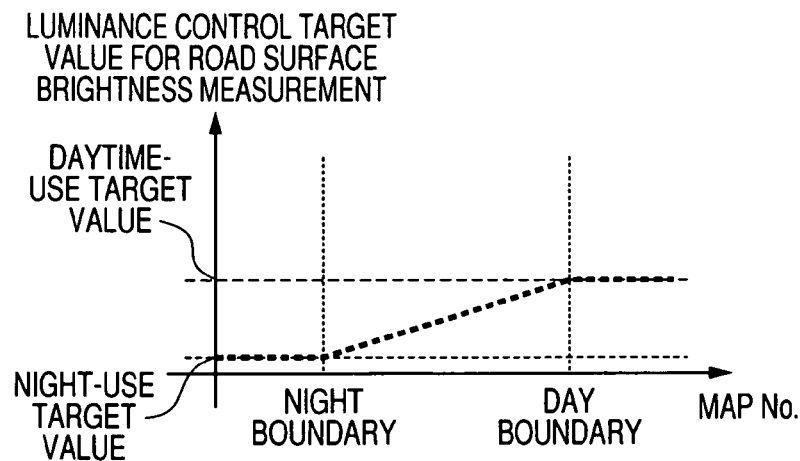
FIG. 4 shows diagrams for use in describing a way of setting luminance control target values which are used with the embodiment.

An embodiment of an exposure control apparatus for a vehicle-mounted camera will be described in the following referring to the drawings.

1. Overall Configuration

FIG. 1 is a block diagram showing the general configuration of a exposure control apparatus 10 and its relationship to other components of a vehicle system. The exposure control apparatus 10 is installed in a vehicle (the "local vehicle") and is connected to a vehicle-mounted digital video camera (referred to in the following simply as the camera) 21 and to a unified judgement section 22, with the unified judgement section 22 being connected to a warning indication generating section 23 and a steering control ECU 24 as shown. Data obtained by the exposure control apparatus 10 based on the contents of captured images of a scene ahead of the local vehicle are used in warning indication processing and steering control processing that are executed by the unified judgement section 22.

The exposure control apparatus 10 consists of a CPU 11, a memory section 12, an image interface 13 which transfers data of successive captured images from the camera 21 to the CPU 11, and a communication interface 14 for executing communication with the unified judgement section 22. The memory section 12 includes a non-volatile memory such as a ROM (read-only memory, not shown in the drawings) having programs and data including a plurality of luminance control maps (described hereinafter) stored therein beforehand, and a RAM (random-access memory, not shown in the drawings) and data registers, for storing and processing data of a plurality of images which have been successively captured up to the current point in time.

The camera 21 is installed within the passenger compartment of the local vehicle at a fixed position (for example, beside the rear view mirror), and captures successive images (i.e., as respective video signal frames) of a region of the road ahead of the vehicle. When installed in the vehicle, the orientation of the camera 21 is adjusted such as to set a specific image capture range with respect to the direction of advancement of the vehicle.

The camera 21 incorporates a usual type of CCD or CMOS image sensor, together with a video amplifier, A/D (analog-to-digital) converter, etc. When an image is captured by the image sensor, as an analog signal expressing successive luminance values, the video amplifier applies a specific amount of gain to the analog signal, which is then converted to successive digital values (luminance values of picture elements) by the A/D converter, and stored as data in the memory section 12. The CPU 11 then reads out and processes the image data, operating separately on respective picture lines of the image, where each picture line is a horizontal row of picture elements (horizontal scan line) of the image.

The image interface 13 transfers the picture element values, together with horizontal and vertical synchronizing signals of the image, from the camera 21 to the CPU 11. The CPU 11 determines respective image positions corresponding to each of the picture elements, based upon the horizontal and vertical synchronizing signals. The picture element values are then stored in the memory section 12, in correspondence with position information specifying the respective locations of the picture elements within the image.

The CPU 11 processes the image data to perform recognition of a specific type of object (target object) such as a preceding vehicle which may be located ahead of the local vehicle and appear in the captured images. Based on the recognition processing results, the CPU 11 supplies position information concerning any target object to the unified judgement section 22 via the exposure control apparatus 10.

In addition, the CPU 11 controls the camera 21 such as to appropriately capture images of the scene ahead of the vehicle. Specifically, the CPU 11 adjusts the frame rate and the exposure parameters of the camera 21, by generating corresponding adjustment commands and supplying these to the camera 21 as camera control command values. In the following it is assumed that the exposure parameters of the camera 21 are the shutter speed and video amplifier gain.

The communication interface 14 enables communication between the CPU 11 and the unified judgement section 22, for transferring to the unified judgement section 22 the above-described information concerning results of target object recognition. Based on this information, the unified judgement section 22 judges whether there is a danger of collision between the local vehicle and a target object. When it is judged that such a danger exists, the unified judgement section 22 controls the warning indication generating section 23 to generate a warning indication to the vehicle driver. If the danger is judged to be above a predetermined level, then in addition to generating a warning indication, the unified judgement section 22 also instructs the steering control ECU 24 to perform appropriate steering control of the vehicle. Specifically, this may be control whereby the amount of steering assistance that is applied to the steering mechanism is adjusted appropriately, or whereby the steering mechanism is controlled to be automatically driven such as to avoid the danger of collision.

2. Outline of Exposure Control

The camera exposure control operation of this embodiment will be summarized in the following. The exposure control apparatus 10 data has stored therein beforehand expressing a plurality of characteristics referred to in the following as luminance control maps. Each of these corresponds to a specific exposure condition of the camera 21 (specific combination of shutter speed and video amplifier gain), and expresses the relationship between the brightness of an external scene ahead of the vehicle which is captured as an image by the camera 21, and resultant luminance values of picture elements of the image. The picture element luminance values are supplied from the camera 21 as respective digital values.

FIG. 2 shows an example of such a plurality of luminance control maps, with values of external scene brightness plotted along the horizontal axis and image luminance (picture element luminance values, as obtained from the camera) along the vertical axis.

In the example of diagram (a) of FIG. 2, if the image luminance (e.g., average of a plurality of picture element values) is a value V (referred to herein as a luminance control target value, which is predetermined as being an appropriate value of image luminance), when a capture-objective brightness value (measured as described hereinafter) is B and the luminance control map 11 is being used, then this is a condition in which the camera exposure parameters (shutter speed, video amplifier gain), determined by the luminance control map 11, are correctly set.

Referring to diagram (b) of FIG. 2 however in which the luminance control map No. 7 is being used, with the capture-objective brightness value B being as shown, the image luminance value deviates from the target value V, i.e., takes the value K, so that the camera exposure is not correctly set. In that case the apparatus performs exposure control by selecting the luminance control map No. 13, so that the image luminance will be restored to the target value V. Exposure control is thereby applied such as to maintain the image luminance close to an appropriate value, irrespective of variations in brightness of the scene that is captured by the camera.

The luminance control target value is determined in accordance with the luminance control map which is currently selected, i.e., there is a predetermined relationship between the luminance control map numbers and the luminance control target values, as described hereinafter.

With this embodiment, instead of measuring the scene brightness based on all of the picture elements of a captured image from the camera 21 it is derived based on a fixedly predetermined part of each image, having a specific shape, location and size, referred to as the brightness measurement region.

The exposure control apparatus 10 of this embodiment basically performs exposure control in accordance with the following sequence of operations (1) to (4).

(1) Determination of Luminance Control Target Value

The luminance control target value is determined in accordance with the currently selected luminance control map, based on the aforementioned predetermined relationship, and varies between a day value and a night value. To ensure that the control conditions do not change abruptly, the luminance control target value varies only gradually during each transition between the day value and night value.

(2) Calculation of Dead Zone

A dead zone (illustrated in FIG. 5) of brightness values is determined, as described hereinafter.

(3) Derivation of Capture-Objective Brightness Value

Figure 7:
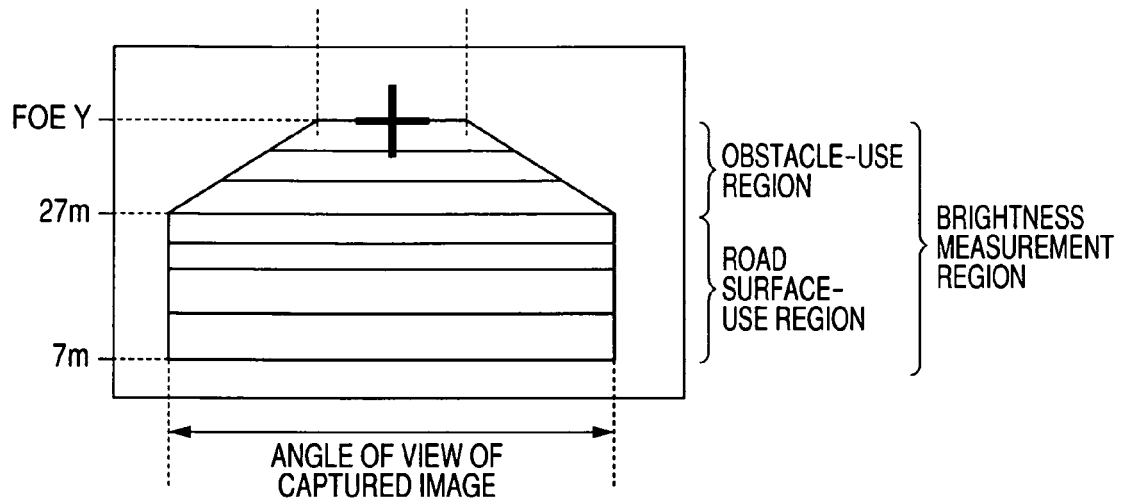
FIG. 7 illustrates the form of a brightness measurement region of an image.

Two adjoining regions within each captured image constitute the aforementioned brightness measurement region with this embodiment, i.e., a road surface-use region for measuring the brightness of the road surface, and a target object-use region for measuring the brightness of a preceding vehicle (when present), as shown in FIG. 7. With this embodiment, respectively different forms of weighted-averaging processing are applied to these two regions, and a capture-objective brightness value is obtained as a combination of resultant average values calculated for the two regions.

(4) Control of Amplifier Gain and Shutter Speed

If the capture-objective brightness value obtained by operation (3) is found to be outside the dead zone, an appropriate other one of the luminance control maps is selected to be used, based upon the luminance control target value determined in operation (1) and upon the capture-objective brightness value obtained in operation (3), as described above referring to diagram (b) of FIG. 2. The exposure condition (shutter speed and amplifier gain) of the camera 21 is then adjusted in accordance with the newly selected luminance control map.

3. Processing Executed by CPU

The CPU 11 periodically (e.g., once in every 100 ms) executes a processing routine in accordance with a stored program, as exposure control processing. In this processing, a capture-objective brightness value is derived based upon data of one or more images that have been successively acquired up to the current point in time from the camera 21 and stored in the memory section 12. Based on this capture-objective brightness value, the luminance control map is changed if necessary, and the camera exposure parameters (shutter speed, amplifier gain) adjusted accordingly. This processing will be described referring to the flow diagram of FIG. 3.

When processing begins, the CPU 11 first (step S110) determines a luminance control target value. Specifically, a correspondence relationship (shown as the full-line characteristic in the diagram (c) of FIG. 4) is stored beforehand, relating luminance control map numbers (e.g., the map numbers 1 to 17 shown in FIG. 2), plotted along the horizontal axis, to luminance control target values which are along the vertical axis. Based on that correspondence relationship, a luminance control target value is derived in accordance with the number of the luminance control map which is currently being used.

At the first execution of the processing routine of FIG. 3 (when operation of the system is started), a predetermined one of the luminance control maps is selected to be utilized, and the corresponding luminance control target value is obtained.

Figure 4B:
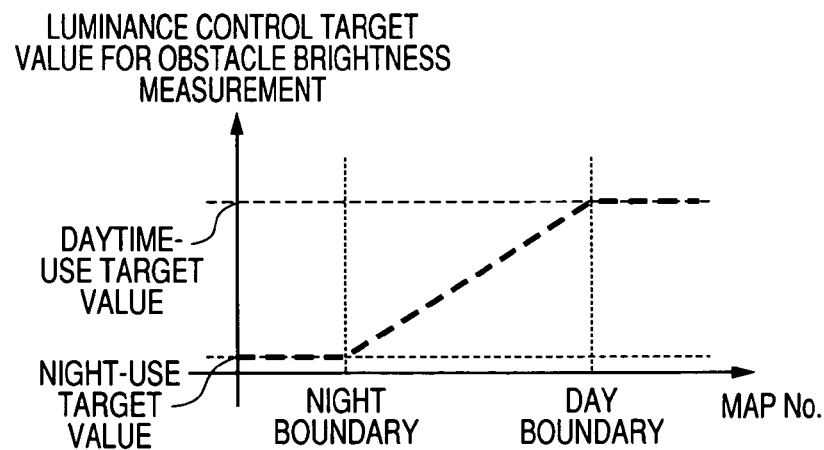
Figure 4C:
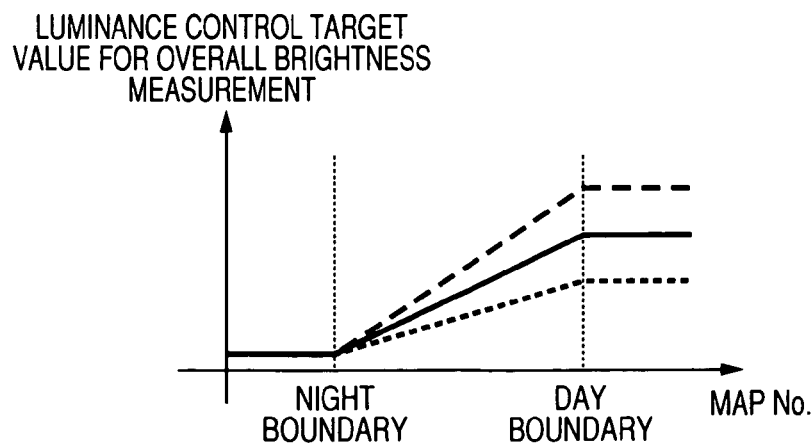

The correspondence relationship of FIG. 4(c) is derived by averaging the correspondence relationships of FIGS. 4(a) and 4(b), which are respectively shown as a dotted-line characteristic and as a broken-line characteristic in FIG. 4(c). FIG. 4(a) is a relationship between luminance control map numbers (plotted along the horizontal axis) to road surface luminance control target values (along the vertical axis) which is appropriate for the aforementioned road surface-use region of the brightness measurement region (i.e., an image region containing a part of the road surface that is close to and directly ahead of the local vehicle). FIG. 4(b) is a corresponding relationship which is appropriate for the target object-use region of the brightness measurement region (an image region which is some distance ahead of the local vehicle and may contain a target object such as a preceding vehicle).

Hence with this embodiment, each luminance control target value is not simply determined as being appropriate for an image region in which a target object is to be recognized, but instead is derived as a combination of target values that are appropriate for a target object and for the road surface, respectively.

When the average scene brightness is low (in general, at night), luminance control maps having low numbers will be selected for use, whereas when the average scene brightness is high (during daytime), maps having high numbers will be utilized. With this embodiment as illustrated in FIG. 4, the relationship between the luminance control target values and map value numbers is predetermined such that a low luminance control target value is selected during night operation and a higher luminance control target value is selected during daytime operation. This is done to ensure that the apparatus will function correctly even when large-scale increases in image luminance occur during night-time operation (e.g., due to light received from sources such as headlamps of oncoming vehicles, etc.).

Also as shown, there is a gradual transition between the night-use luminance control target value and the daytime-use luminance control target value, to prevent abrupt changes in image luminance. Since the luminance control target value is selected in accordance with the luminance control map which is currently in use, the gradual transition is achieved by appropriately relating the luminance control target values to the luminance control map numbers.

Figure 5:
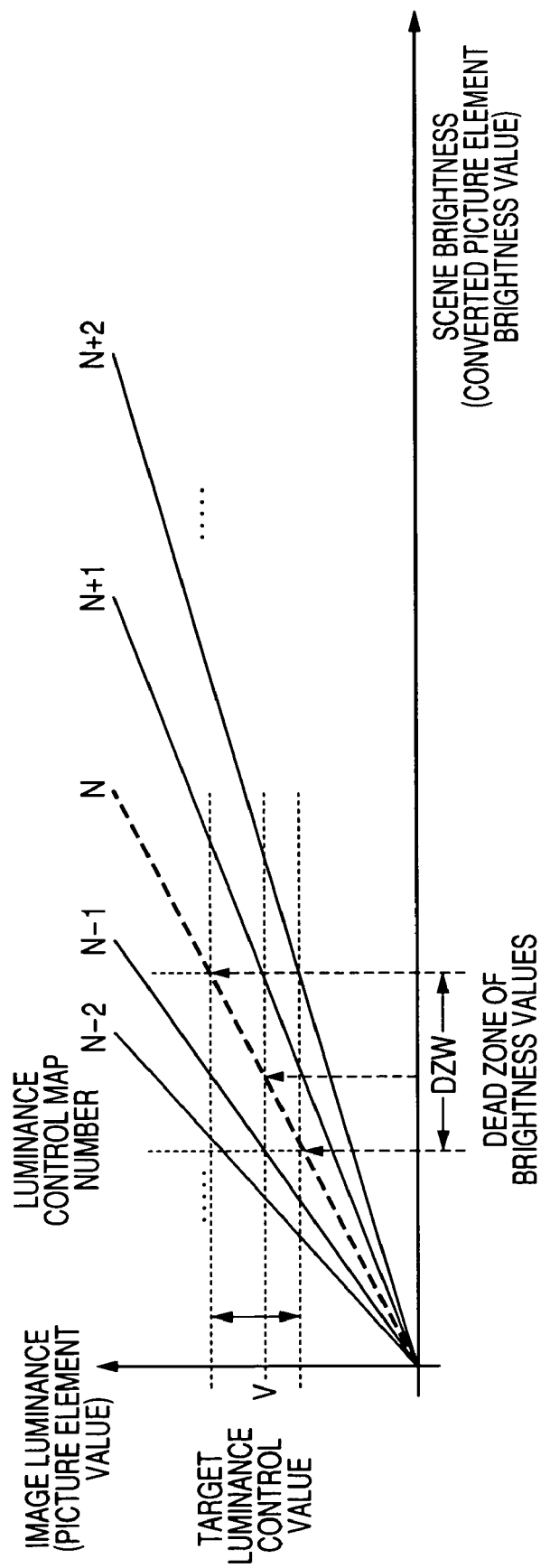
FIG. 5 is a diagram for describing a dead zone of brightness values.

Next in step S120, the dead zone is calculated. This is a range of brightness values for use in judging whether it is necessary to adjust the camera exposure (select another luminance control map). The dead zone is used to prevent unnecessary frequent changes in the exposure condition. Specifically as shown in FIG. 5, designating the luminance control map that is currently being used as map N, and designating the corresponding luminance control target value (obtained in step S110 as V, the dead zone is defined as a scene brightness range extending between the intersections of the luminance control target value V with the two adjacent luminance control maps (N−1) and (N+1) (i.e., maps whose numbers immediately precede and immediately succeed that of the currently selected luminance control map).

Next in step S130, processing is performed to obtain the capture-objective brightness value. This is based on converting the picture element luminance values of the brightness measurement region (i.e., specific fixed region within the image) to corresponding converted brightness values by using the luminance control map which is currently selected, and will be described referring to the flow diagram of FIG. 6.

Firstly in step S131, the picture element values of the brightness measurement region are acquired, in units of picture lines. As shown in FIG. 7, the brightness measurement region of this embodiment is formed of a trapezoidal region referred to as the target object-use region, for measuring the brightness of a preceding vehicle (i.e., a region located some distance ahead of the local vehicle, at a position where a preceding vehicle may appear in the image) and a rectangular region referred to as the road surface-use region, corresponding to a part of the road which is located close to and immediately in front of the local vehicle, and which serves for measuring the brightness of the road surface. The image luminance value is measured as a combination of values that are derived from the target object-use region and the road surface-use region.

Specifically, the road surface-use region has a vertical dimension (height dimension) corresponding to an area that extends approximately 7 to 27 meters ahead from the front of the local vehicle, and a width dimension (lateral dimension) determined such as to contain the two white lines which are located respectively at the right and left sides of a traffic lane in which the local vehicle is running.

The uppermost part of the target object-use region is set at the FOE (focus of expansion) position for the camera 21. The width of that uppermost part is made equal to the typical azimuth extent (±10°) of a region scanned by a millimeter-wave radar apparatus which may be installed in the local vehicle, for scanning the scene ahead of the vehicle with radar waves and judging the position, shape, speed, etc., of preceding objects based on resultant reflected radar waves.

The trapezoidal shape of the target object-use region successively widens towards the upper part of the road surface-use region, i.e., it is formed of picture lines that are of successively increasing length, whereas the road surface-use region is formed of full-width picture lines (corresponding to the full horizontal angle of view of the camera 21). This shape of the target object-use region is used to ensure that the camera exposure can be rapidly adjusted when another vehicle cuts in ahead of the local vehicle, i.e., to provide a seamless transition between detecting the brightness of the road surface and detecting the brightness of a preceding vehicle.

Since the external region (in the scene ahead of the local vehicle) that is beyond the FOE will generally contain features such as sky, buildings, etc., which are not relevant as target objects, it is ensured that these are excluded from the captured images, and so will not have an adverse effect upon exposure control.

To reduce the data processing load, thinning-out of picture lines is performed (i.e., with one out of each of successive pluralities of picture lines of the image being omitted) when extracting (from the most recently captured image) picture elements constituting the luminance measurement region. In the road surface-use region, thinning-out of picture lines is performed at spacings which are approximately identical to one another with respect to distance from the local vehicle. That is to say, the higher the positions of the lines within the luminance measurement region, the smaller is made the proportion of lines omitted by the thinning-out processing. In the target object-use region, the thinning-out is performed at regular spacings, i.e., the spacing between lines that are omitted by the thinning-out processing is held constant.

Figure 8:
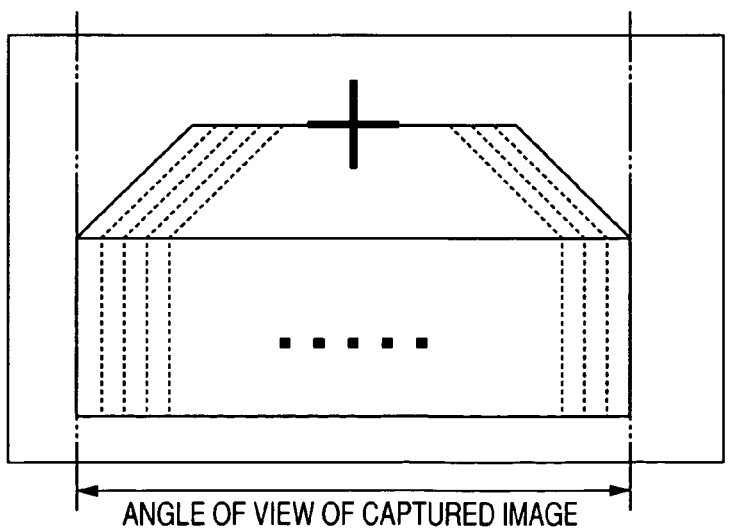
FIG. 8 illustrates thinning-out of picture elements from respective lines of the brightness measurement region.

In addition, periodic thinning-out of picture elements within each line of the brightness measurement region is also performed, as indicated conceptually by the dotted-line portions in FIG. 8. With this embodiment, this periodic omission of respective picture elements (i.e., of luminance values corresponding to these picture elements) is performed at identical spacings within each picture line.

The luminance values of the picture elements of the brightness measurement region are the converted to respectively corresponding brightness values (i.e., indicative of brightness values in the external scene) by using the currently selected luminance control map and luminance control target value. Referring for example to diagram (b) of FIG. 2, assuming that a picture element value (luminance value) obtained from the camera 21 is K, then as indicated by the directions of the arrows, the corresponding converted brightness value is obtained as B by applying the currently selected luminance control map No. 7.

Next in step S132, for each picture line of the brightness measurement region, the picture elements are sorted in order of brightness value, then a fixed number of maximum-brightness picture elements and a fixed number of minimum-brightness picture elements of that line are excluded from further processing.

Assuming each of these fixed numbers is greater than one, the term "fixed number of maximum-brightness picture elements" as used in this description and in the appended claims signifies "the maximum-brightness picture element and one or more picture elements having successively lower brightness than the maximum-brightness value". Similarly, the term "fixed number of minimum-brightness picture elements" signifies the lowest-brightness picture element and one or more picture elements having converted brightness values that axe successively higher than the minimum value.

Although with this embodiment, the above exclusion processing is performed based upon judging converted brightness values of picture elements, it would also be possible to perform the exclusion processing based upon judging the luminance values, i.e., the picture element values as obtained from the camera 21.

Figure 10:
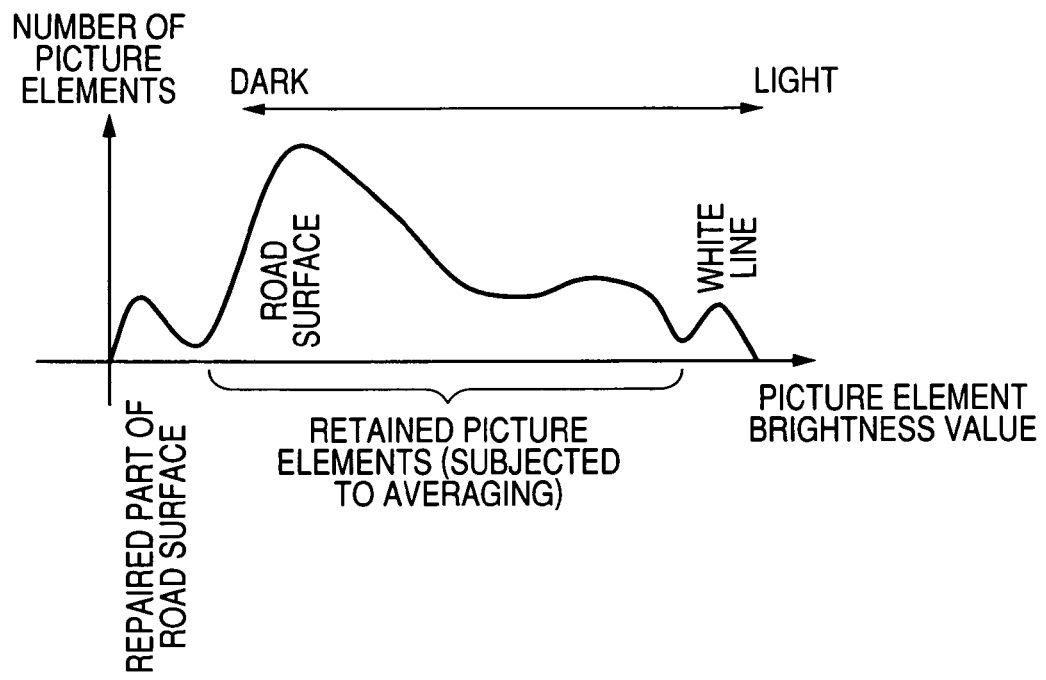
FIG. 10 is a diagram showing an example of distribution of brightness values in an image captured by a vehicle-mounted camera.

In the case of a road surface having a light coloration, such as a concrete surface, dark regions on the surface (such as portions repaired with coal tar, or joints in the roadway) are an obstruction to reliably measuring the brightness of the road surface. In the case of a dark road surface, e.g., formed of asphalt, white lines that are formed on the surface will similarly hinder reliable measurement of the brightness of the road surface. This is illustrated by the example of the distribution of brightness values of picture elements, for the case of a forward-view image of a road, shown in FIG. 10. With this embodiment, since highest and lowest brightness values of the brightness measurement region are excluded from further processing as described above, such problems due to excessively light or excessively dark regions on the road surface can be overcome.

In the case of a part of the road surface that is close to (directly ahead of) the local vehicle, it is possible to comparatively reliably distinguish excessively high or low brightness values resulting from white lines, coal tar patches, etc., on the road surface. However in the case of a part of the road surface that is distant from the local vehicle, it becomes difficult to distinguish such regions. For that reason, the farther the distance represented by the image position of a picture line (i.e., the higher the location of that line within the brightness measurement region) the smaller is made the number of picture element values that are excluded from the line by the exclusion processing described above. In the case of the picture lines corresponding to the most distant part of the brightness measurement region, no picture element values are excluded.

Figure 11:
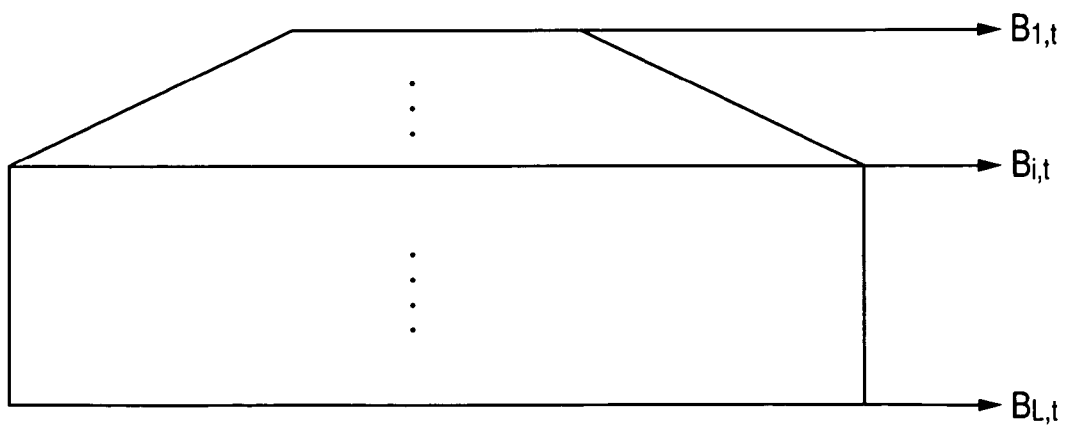
FIG. 11 illustrates the derivation of average brightness values of respective lines of picture elements in the brightness measurement region.

Next in step S133 as illustrated in FIG. 11, for each of the remaining picture lines of the brightness measurement region, the average of the converted brightness values of the picture elements of the line is calculated. The resultant respective average values are designated as $B_{i,t}$, where "i" denotes the position of the corresponding line within the brightness measurement region in a range from 1 to L, counting from the top of the brightness measurement region (as illustrated in FIG. 11), i.e., $1 \leq i \leq L$. The subscript portion "t" denotes the time-axis position of a picture element (spatial-domain) average value, e.g., expressed as a sequence number within a series of images successively captured at periodic time points up to the current time point.

By excluding the highest and lowest luminance values from this averaging processing it is ensured that, for each of the picture lines of the brightness measurement region, the (spatial) average brightness values of respective lines will vary in a more stable manner over time.

Next in step S134, for each of the L picture lines of the brightness measurement region, buffering is performed of the respective average luminance values that have been obtained for that picture line in a plurality of successively obtained images, using a buffer interval of (t~t–T). That is, for each of the picture lines, a set of (spatial-domain) average values which have been previously successively calculated and stored at respective time points are acquired (read out from memory) and set in buffer registers, to be subjected to averaging calculation. These buffered average values can be expressed as:

1st line: $B_{1,t} \ldots B_{1,t-T}$
i-th line: $B_{i,t} \ldots B_{i,t-T}$
L-th line: $B_{L,t} \ldots B_{L,t-T}$ If for example the buffering interval is 4, then for each of the picture lines in the range 1 to L, the corresponding respective average brightness values that have been stored in the memory section 12 for four successive images are acquired as the buffered average values for that picture line.

Next in step S135, time-axis filtering (i.e., smoothing by averaging processing) is applied to each of selected picture lines of the brightness measurement region (these picture lines being selected as described hereinafter). The time-axis filtering is performed by obtaining, for each of the selected picture lines, the average of the buffered values that have been acquired in step S134, i.e., assuming a continuous set of L lines:

1st line: $B_{1,t} \ldots B_{1,t-T} \rightarrow F_{1,t}$
i-th line: $B_{i,t} \ldots B_{i,t-T} \rightarrow F_{i,t}$
L-th line: $B_{L,t} \ldots B_{L,t-T} \rightarrow F_{L,t}$ It can be expected that there will be only a small degree of variation in the average brightness values of picture lines corresponding to a region that is close to (i.e., is immediately ahead of) the local vehicle, since the brightness of such a region will generally be determined by reflection of light from the road surface. Hence, little or no time-axis filtering is applied to picture lines of such a part of the brightness measurement region. However in the case of picture lines corresponding to a region that is distant from the local vehicle (i.e., is close to the FOE), there may be large amounts of time-axis variations in the successive average brightness values that are obtained for these picture lines. These variations can result from effects such as pitching of the local vehicle while light received from headlamps of opposing vehicles is affecting the brightness measurement region, thereby causing large changes in the successive average brightness values that are measured for these picture lines corresponding to a distant region.

For that reason, when time-axis filtering as described above is applied to a picture line corresponding to a region that is close to the FOE, a comparatively long buffer interval is used, for example corresponding to approximately 700 ms, i.e., averaging is performed using a large number of successively obtained values (large value of T).

This is made possible since with this embodiment, time axis filtering can be applied individually to respective picture lines of the brightness measurement region.

Figure 12:
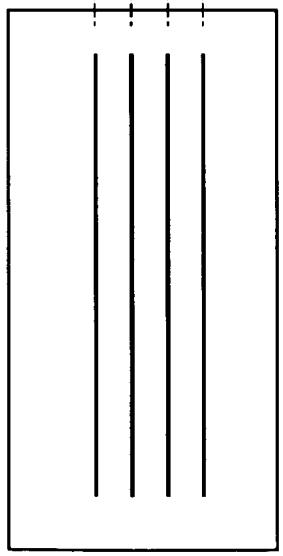
FIG. 12 illustrates a manner in which the strength of time-axis filtering applied to successively obtained average brightness values of respective lines of picture elements in the brightness measurement region is determined.

The above selective application of time-axis filtering to picture line average brightness values in accordance with distance from the local vehicle is illustrated in FIG. 12. As indicated, the greater the distance of an imaged region (that is, the higher the position of the corresponding picture lines within the captured image), the higher is made the effectiveness of the time-axis filtering against noise (scattered fluctuations in brightness), that is to say, the greater is made the degree of smoothing that is applied against time-axis variations. Conversely, no time-axis filtering is applied to the average brightness values of picture lines in the part of the brightness measurement region that is closest to the local vehicle.

However it is also necessary that the apparatus be able to rapidly follow sudden changes in the scene brightness, in particular, the road surface brightness, which can occur when the local vehicle enters or leaves a tunnel, etc. Hence for each of the picture lines of the brightness measurement region, the time-axis filtering is selectively applied in accordance with the form of variations in the successive average brightness values obtained for that line. This is done in order to suppress fluctuations in the successive capture-objective brightness values while at the same time achieving a fast reaction to sudden changes in external scene brightness. This processing is applied to each of the picture lines of the brightness measurement region.

Figure 13C:
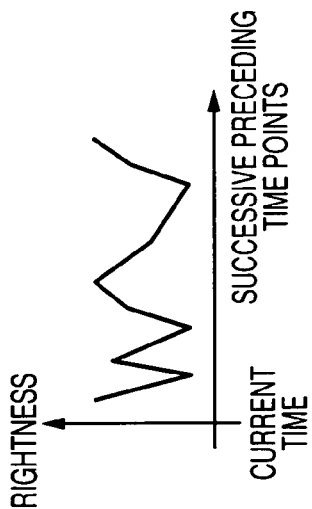
FIG. 13 shows diagrams illustrating an operation of judging whether or not time-axis filter is applied to respective lines of picture elements in the brightness measurement region.
Figure 13B:
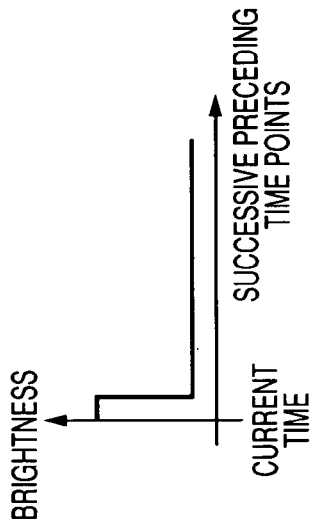
Figure 13A:
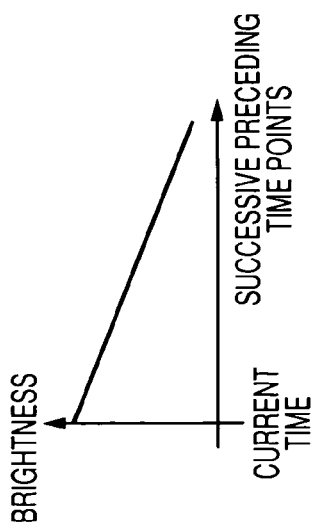

Specifically with this embodiment, if the successive average brightness values that are obtained for a picture line are found to be changing gradually over time as in the example of diagram (a) of FIG. 13, i.e., along a trend, without scattering of values, then time-axis filtering is not applied. That is to say, the average value obtained for that picture line in the most recently captured image is used directly in calculating the image luminance value (that calculation described hereinafter).

If it is found that scattered transient fluctuations are occurring in the average values obtained for a picture line, as illustrated in diagram (b) of FIG. 13, then time-axis filtering by weighted median filtering is applied to the successive average values. In all other cases, such as when the average values obtained for that picture line are successively varying as illustrated in diagram (c), time-axis filtering by non-weighted averaging is applied.

The term "weighted median filtering" as used herein signifies an averaging calculation in which greater weight is given to newer data than to older data.

The above processing performed in step S135 will be described more specifically in the following.

Assuming for example that T is 4, where the buffer interval is (t-~t-T), the average brightness values of the i-th picture line within a buffer interval will be assumed to have the following magnitude relationships:

$$B_{i,t-1} < B_{i,t-3} < B_{i,t-2} < B_{i,t-4} < B_{i,t-0}$$

If either of the relationships of expression (1) below is satisfied, it is judged that scattered fluctuations are occurring in the successive average values obtained for the picture line, i.e., if the absolute difference between the newest value and the mid-point value exceeds the half-width (DZW/2) of the dead zone multiplied by the time separation (T/2) between these values. In that case, weighted median filtering is applied.

$$\frac{B_{i,t-0} - B_{i,t-2}}{DZW/2} > \frac{T}{2} \text{ or } \frac{B_{i,t-0} - B_{i,t-2}}{DZW/2} < -\frac{T}{2} \quad (1)$$

If either of the relationships of expression (2) below is satisfied, then it is judged that a gradual variation (a trend) is occurring in the successive average brightness values of that picture line, so that time-axis filtering is not applied, i.e., if the absolute difference between the newest value and the mid-point value does not exceed the width (DZW) of the dead zone multiplied by the time separation (T/2) between these values. Similarly, time-axis filtering is not applied if either of the relationships of expression (3) below is satisfied, i.e., if the absolute difference between the newest value and the oldest value does not exceed the width (DZW) of the dead zone multiplied by the time separation (T) between these values.

$$\frac{B_{i,t-0} - B_{i,t-2}}{DZW} > \frac{T}{2} \text{ or } \frac{B_{i,t-0} - B_{i,t-2}}{DZW} < -\frac{T}{2} \quad (2)$$

$$\frac{B_{i,t-4} - B_{i,t-0}}{DZW} > T \text{ or } \frac{B_{i,t-4} - B_{i,t-0}}{DZW} < -T \quad (3)$$

In all other cases, time-axis filtering by non-weighted averaging is applied.

Next in step S136, as shown by equation (4) below, weighted-averaging processing is applied to the set of average brightness values (of respective picture lines) obtained by the selectively applied time-axis filtering of step S135. The result of this weighted-averaging processing will be referred to as the preliminary capture-objective brightness value.

In equation (4), $F_{i,t}$ denotes the average brightness value of a picture line, and $W_i$ denotes a weighting value which is set for the picture line, for example as follows.

The preliminary capture-objective brightness value is obtained as a combination (with this embodiment, an average) of average values obtained for the picture lines of the target object-use region and for the picture lines of the road surface-use region. The brightness values within the road surface-use region (close to the local vehicle) are relatively stable, while those of the target object-use region are more variable. For that reason, when applying equation (4) to the picture line average brightness values of the road surface-use region, the respective weighting values W that are assigned in equation (4) are successively decreased in accordance with increasing closeness of the picture line (i.e., of the region represented by the picture line) to the local vehicle. Conversely, when applying equation (4) to the picture line average values of the target object-use region, the value of W is decreased in accordance with decreasing distance of the picture line (i.e., of the region represented by the picture line).

$$B_{IMG\_Temp,t} = \sum_{i=1}^{L} W_i \times F_{i,t} \quad (4)$$

Next (step S137), a plurality of capture-objective brightness values that have been successively obtained up to the current point are evaluated, to determine the extent of variation of these values. If the extent of variation is within a predetermined limit, then the preliminary capture-objective brightness value is subsequently used in performing exposure control. If the extent of variation exceeds the limit, then low-pass filtering processing (described hereinafter) is applied and the result of this filtering is used in performing exposure control.

This low-pass filtering processing is performed to prevent brightness hunting.

Operation then proceeds to step S140 of FIG. 3.

Applying low-pass filtering to obtain the capture-objective brightness values can cause a lowering of response speed, so that this filtering is applied only when it is judged that these values are fluctuating excessively. The allowable limit of variation of the successive capture-objective brightness values is determined based on the width of the dead zone, as described in the following.

Processing relating to the above low-pass filtering is performed in the following sequence of operations, in which P designates the number of precedingly obtained capture-objective brightness values that are used in evaluating the extent of variation of the capture-objective brightness values:

[1] Buffering of capture-objective brightness values that have been successively measured at periodic time points up to the current point (buffer interval: t~t−P):

$$B_{IMG\#Temp,t} \ldots B_{IMG\#Temp,t-P}$$

Respective differences between each of these capture-objective brightness values and the immediately-precedingly derived capture-objective brightness value are calculated, as shown by equation (5) below (buffer interval: 0~P−1):

$$\text{Diff}_0 = B_{IMG\_Temp,t} - B_{IMG\_Temp,t-1} \ldots \text{Diff}_{P-1} = B_{IMG\_Temp,t-(P-1)} - B_{IMG\_Temp,t-P} \quad (5)$$

[3] The number of alternations in that series of capture-objective brightness values is then calculated, i.e., the number of changes in sign between adjacent difference values (that is, between each pair $\text{Diff}_i$ and $\text{Diff}_{i-1}$ within the set of difference values $\text{Diff}_0 \ldots \text{Diff}_{P-1}$).

Figure 15:
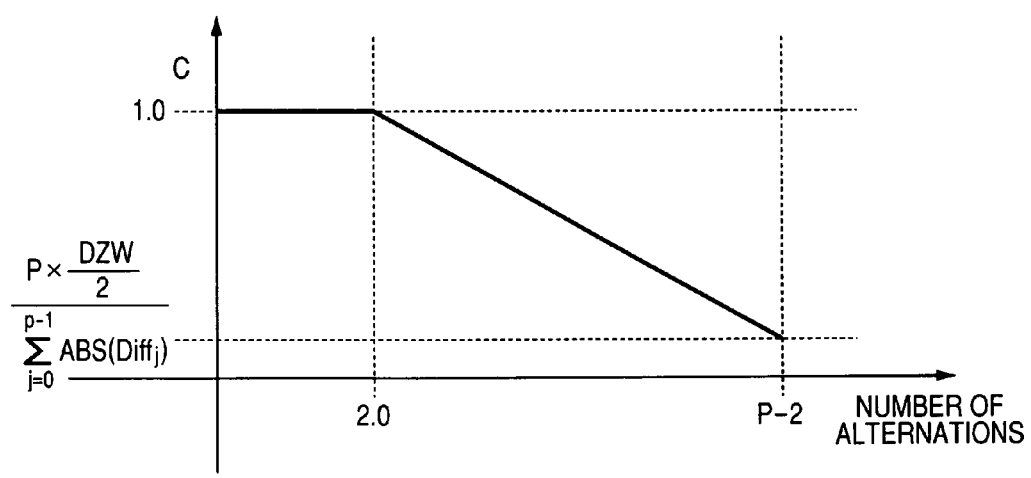
FIG. 15 is a graph which is used in evaluating the magnitude of fluctuations in successively obtained capture-objective brightness values in relations to a half-width value of the dead zone.

[4] The average absolute magnitude of the variations is evaluated in relation to the half-width DZW/2 of the dead zone. Specifically, if expression (6) below is satisfied, then it is judged that C=1.0 (where C is a parameter in equation (8) below). If expression (7) below is satisfied, then the value of C is obtained from the graph of FIG. 15.

$$\frac{\sum_{j=0}^{P-1} \text{ABS}(Diff_j)}{P} < \frac{DZW}{2} \quad (6)$$

$$\frac{\sum_{j=0}^{P-1} \text{ABS}(Diff_j)}{P} \geq \frac{DZW}{2} \quad (7)$$

[5] Low-pass filtering is then selectively applied, in accordance with equation (8) below, to obtain a capture-objective brightness value ($B_{IMG,t}$) for use in exposure control. That is to say, if the value of C is obtained as 1, then the preliminary capture-objective brightness value which was obtained in step S136 is subsequently used directly in exposure control. Otherwise (C<1), a low-pass filtering calculation is performed using at least one precedingly obtained capture-objective brightness value, and the result of this LPF processing is used in exposure control. With this embodiment, the low-pass filtering calculation consists of multiplying the preliminary capture-objective brightness value by C and the immediately precedingly obtained capture-objective brightness value by (1−C), and summing the results, i.e.:

$$B_{IMG,t} = C \times B_{IMG\_Temp,t} + (1-C) \times B_{IMG,t-1} \quad (8)$$

This completes the processing of step S130 of FIG. 3. Next, in step S140 of FIG. 3, a decision is made as to whether the capture-objective brightness value obtained in step S130 is within the dead zone. If it is judged that the capture-objective brightness value is within the dead zone, the processing is ended. If the capture-objective brightness value is judged to be outside the dead zone range, step S150 is then executed in which a luminance control map is selected (as described hereinabove referring to diagram (b) of FIG. 2) in accordance with the capture-objective brightness value obtained in step S130 and the luminance control target value which was determined in step S110. Exposure control is then performed by setting the camera video amplifier gain and shutter speed in accordance with the selected luminance control map. Execution of the processing is then ended.

Figure 16:
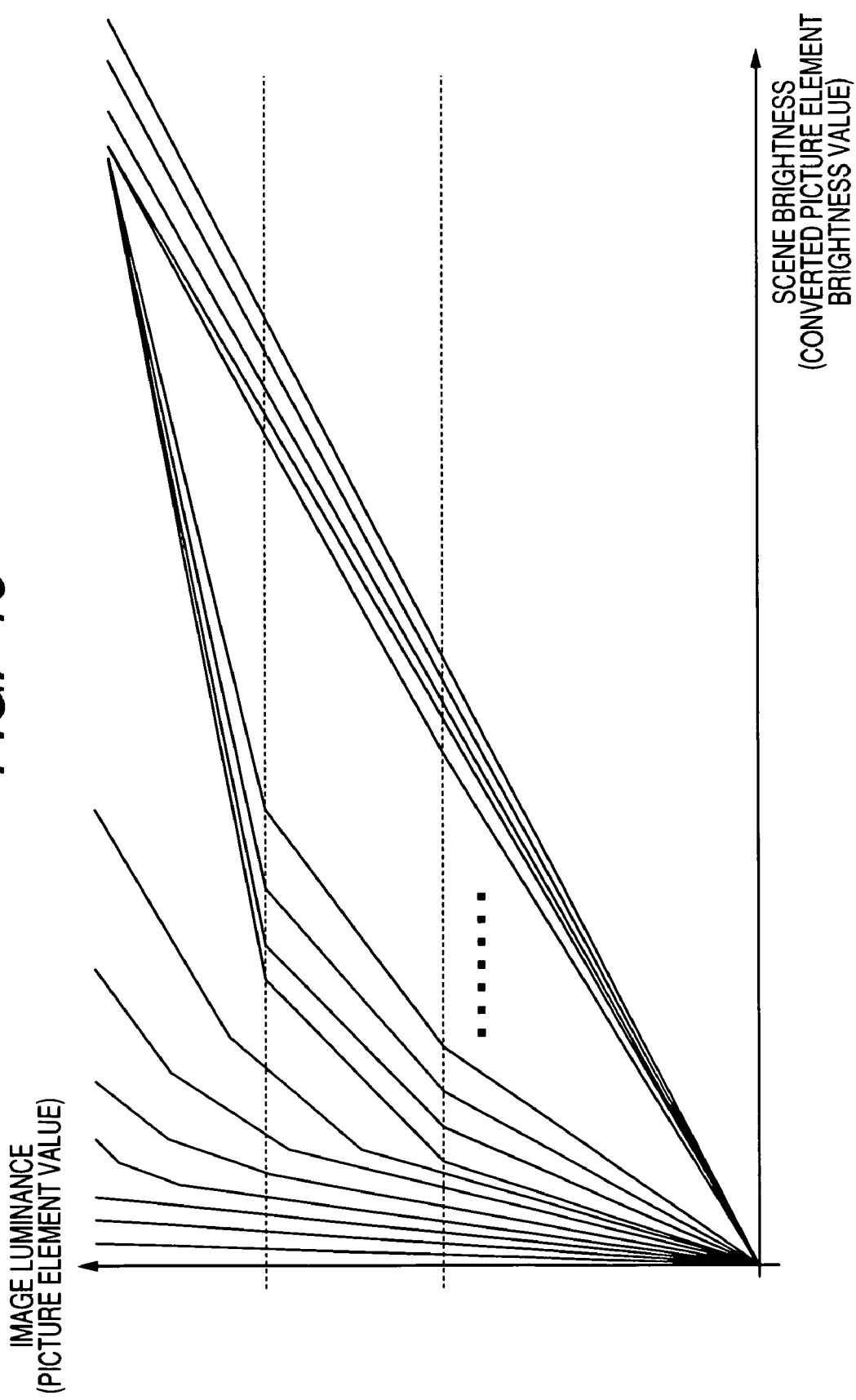
FIG. 16 shows an example of luminance control maps for enabling scene brightness measurement to be performed over a wide range of external scene brightness values.

The embodiment has been described above assuming that each of the luminance control maps have linear characteristics. However the camera 21 may be operated in a HDR (high dynamic range) mode, in which the range between minimum and maximum luminance values of the picture elements corresponds to a wider range of scene brightness values than in a normal mode. In that case, the luminance control maps may become of the form shown in FIG. 16, with bends formed in parts of the map characteristics. As a result of these non-linearities of the luminance control map characteristics, complex limitations may arise in the values of shutter speed and amplifier gain that can be utilized. For that reason it is desirable that the degree of change in the extent of bending, between adjacent luminance control maps is made small.

By using such luminance control maps for HDR operation, when a sudden large change in external scene brightness occurs (for example when the local vehicle enters a tunnel) the time which elapses until appropriate control of the camera exposure is achieved can be reduced.

Figure 6:
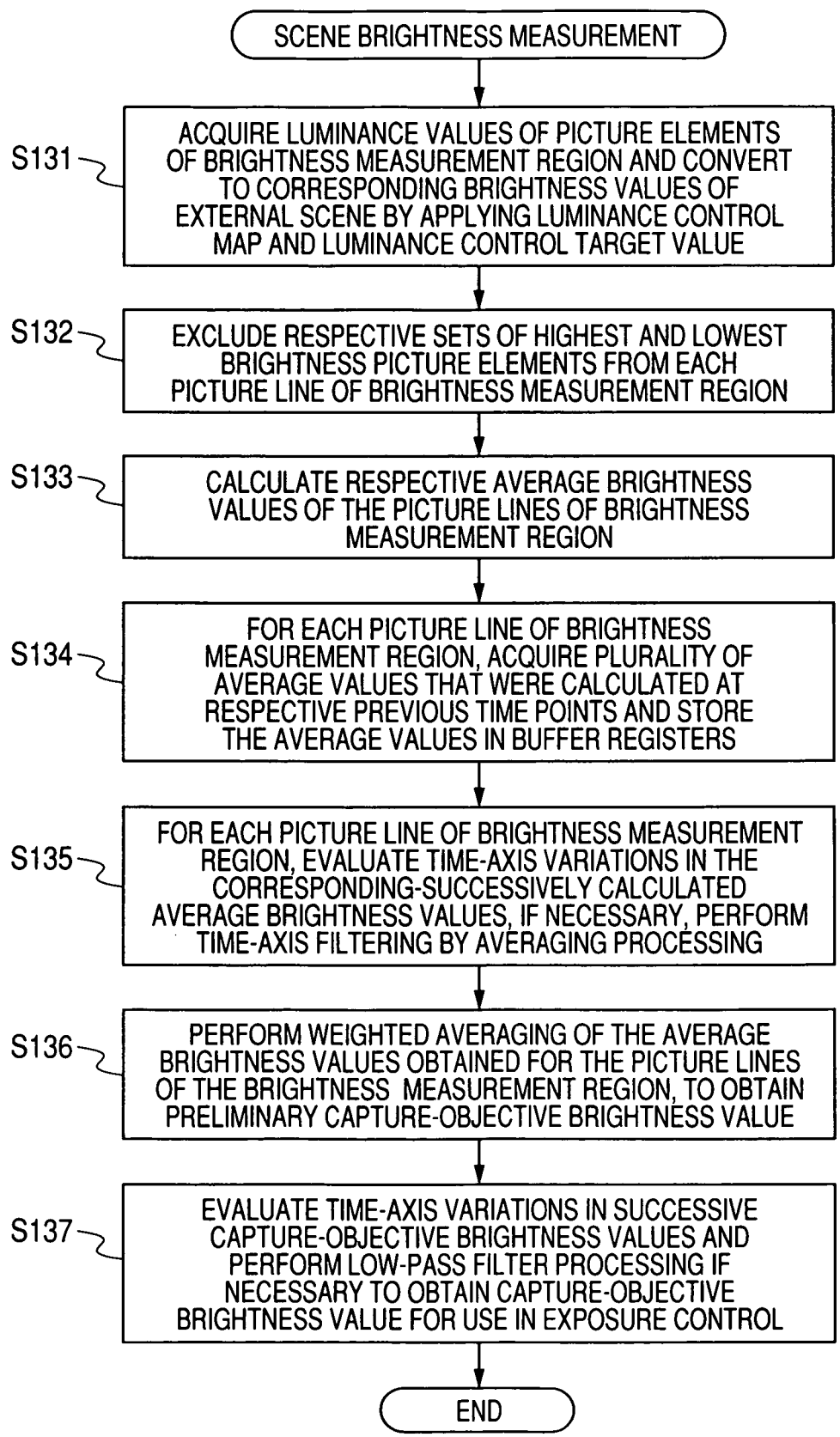
FIG. 6 is a flow diagram of processing for deriving a capture-objective brightness value, indicative of brightness in an external region ahead of a vehicle in which the embodiment is installed.

The processing of FIG. 6 above, for deriving a capture-objective brightness value for use in camera exposure control, can be summarized as follows:

Step S131: Picture elements constituting a brightness measurement region are extracted from a captured image in units of picture lines. The size, shape and location of the brightness measurement region (within the captured image) are predetermined (e.g., as shown in FIG. 7) such as to enable appropriate brightness measurement of both the road surface and also a preceding vehicle.

Step S132a: The luminance values of the picture elements of the luminance measurement region are respectively operated on in conjunction with the currently selected luminance control map, to obtain respective converted brightness values corresponding to these picture elements.

Step, S132b: Sets of highest-brightness and lowest-brightness picture elements are excluded from the luminance measurement region. With the above embodiment, this exclusion is performed separately for each of the picture lines of the brightness measurement region.

Step S133: For each of the picture lines of the brightness measurement region, the average brightness of the remaining picture elements of that line is calculated.

Step S134: For each of the picture lines of the brightness measurement region, the average value obtained for that line in step S133 is set into a data buffer (buffer register), and respective average values which have been similarly obtained for that picture line in each of a specific number (T) of successively preceding captured images are read out from memory and set into buffers. The value of the number T is predetermined in accordance with the distance of the external region represented by the picture line, i.e., in accordance with the height of the picture line within the brightness measurement region.

Step S135: For each of the picture lines of the brightness measurement region, time-axis filtering is selectively applied, i.e., by averaging of the respective average brightness values which have been buffered in step S134. Specifically, the form of time-axis amplitude variation of the values is evaluated, and either simple averaging, weighted-median averaging or no averaging is applied, depending upon the form of variation. The strength of the filtering (degree of smoothing) is determined by the aforementioned number T, i.e., the number of buffered values that are averaged, and is increased in accordance with increasing distance of the respective regions represented by the picture lines.

Step S136: Weighted averaging is applied to the set of average values obtained for the picture lines of the brightness measurement region in step S135, to obtain a preliminary capture-objective brightness value. The weighting values applied for respective picture lines are increased in accordance with increasing distance of the regions represented by the picture lines.

Step S137: Low-pass filtering processing is performed using the preliminary capture-objective brightness value and at least one precedingly obtained capture-objective brightness value (i.e., obtained for a preceding image), and either the result of this filter processing or the preliminary capture-objective brightness value is selected to be used in exposure control.

With the described embodiment, each of the above operation steps S131~S150 is implemented by processing executed by a computer program. However it would be equally possible to implement at least some of these operation steps by dedicated hardware circuits. These operation steps are related to the contents of the appended claims as follows:

Steps S131 and S132a correspond to extraction circuitry configured to extract picture elements constituting the brightness measurement region. Step S132b corresponds to exclusion circuitry configured to exclude respective sets of highest-brightness and lowest-brightness picture elements of each picture line of the brightness measurement region. Steps S131 to S137 correspond to measurement circuitry configured to measure a capture-objective brightness value based on brightness values of remaining picture elements of the brightness measurement region. Steps S140, S150 correspond to exposure control circuitry configured to adjust the exposure condition of the camera based upon a capture-objective brightness value that is obtained by the measurement circuitry.

Effects Obtained

Figure 9:
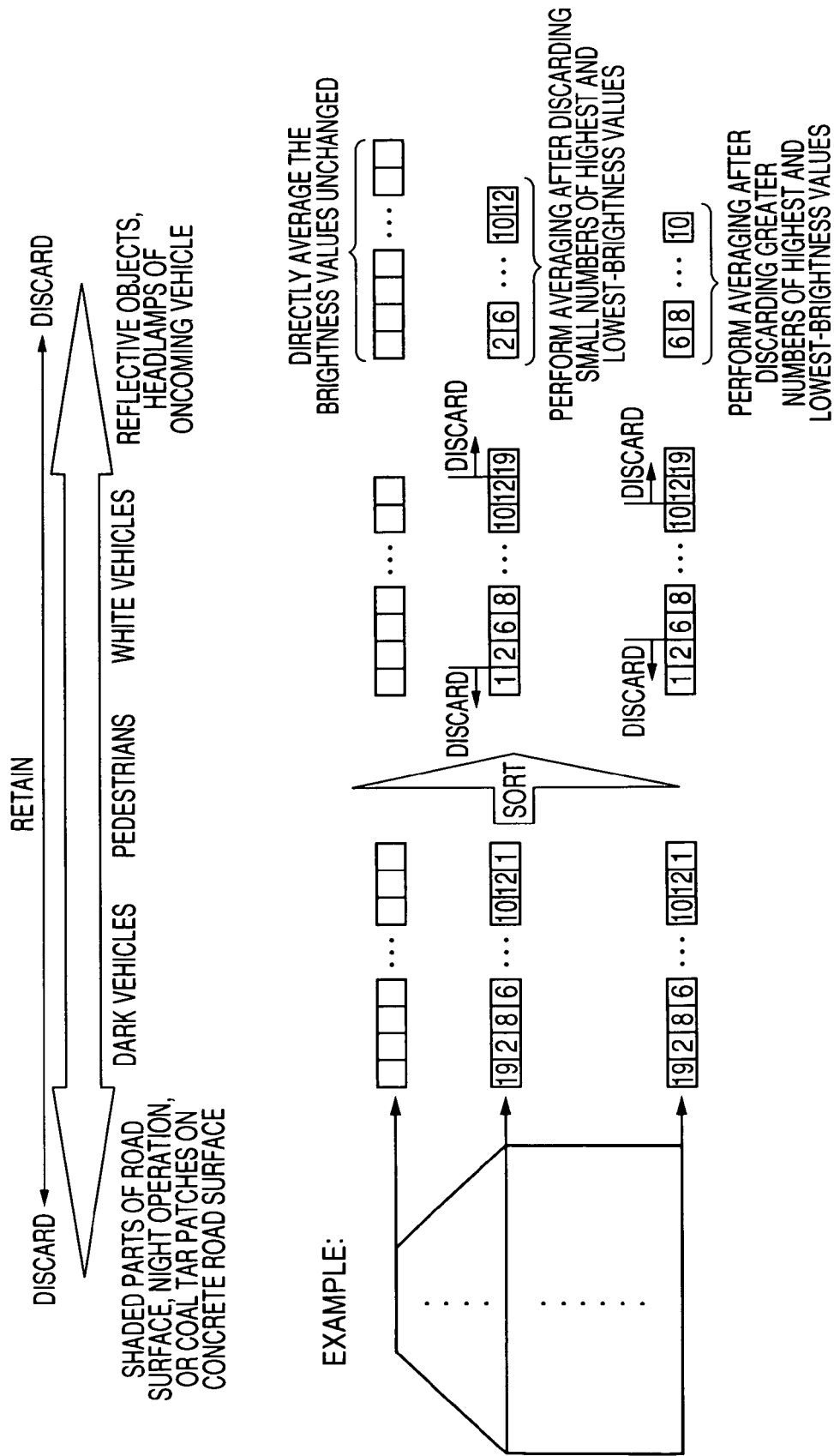
FIG. 9 illustrates exclusion of highest-brightness and lowest-brightness picture elements from each of respective lines of the brightness measurement region.
Figure 17A:
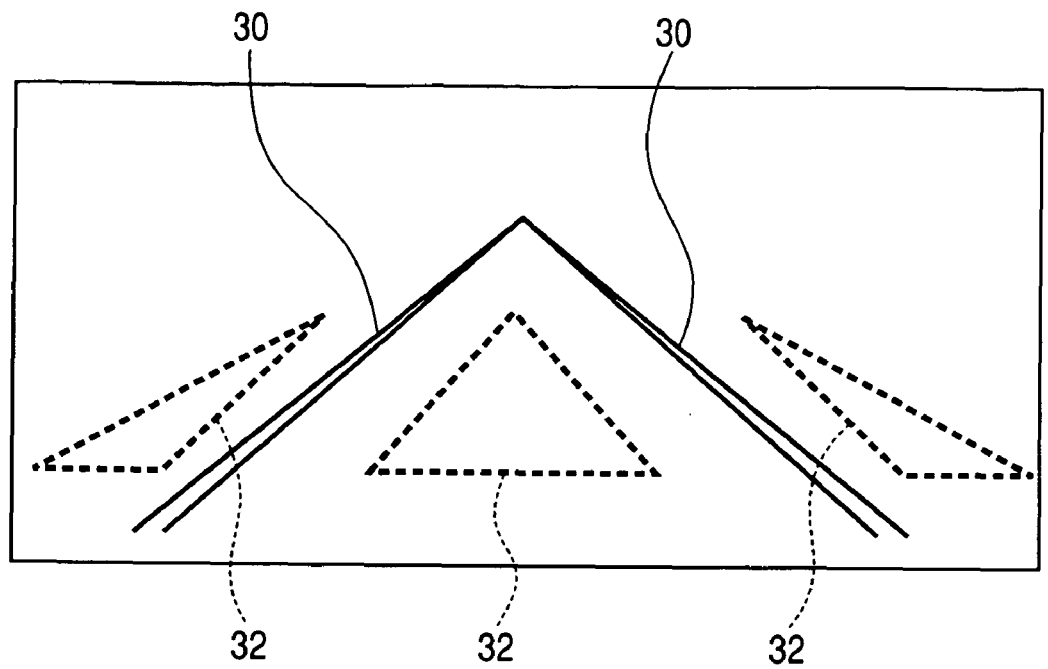
FIG. 17 shows diagrams for describing problems which arise with a prior art exposure control apparatus, with respect to configuring brightness measurement regions that will remain outside white lines that are formed on the road surface.
Figure 17B:
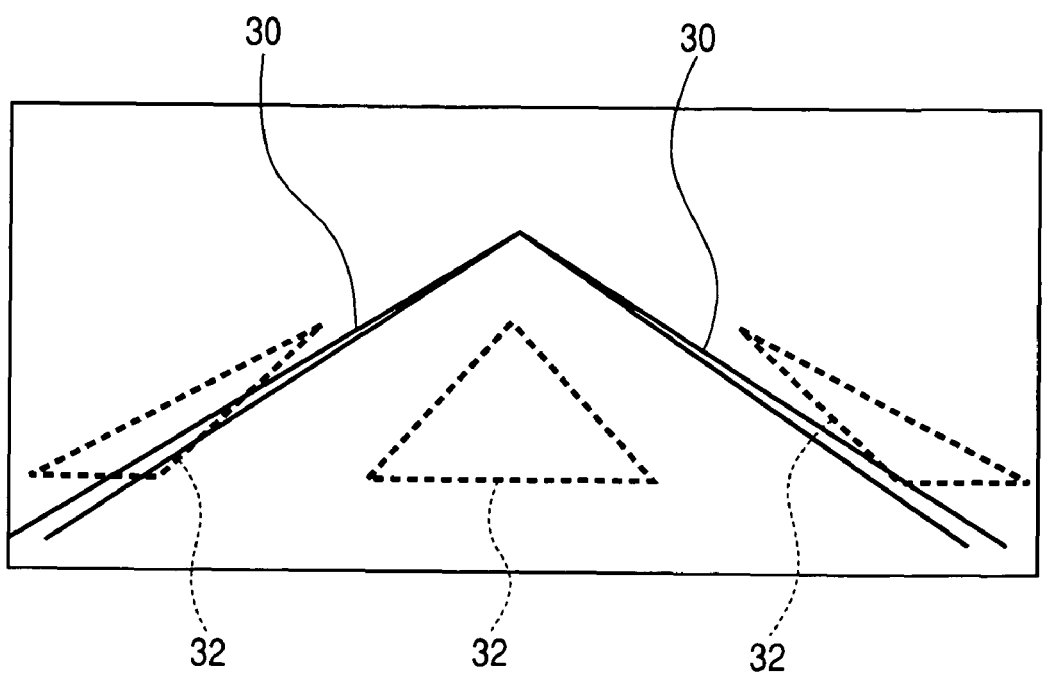
Figure 18:
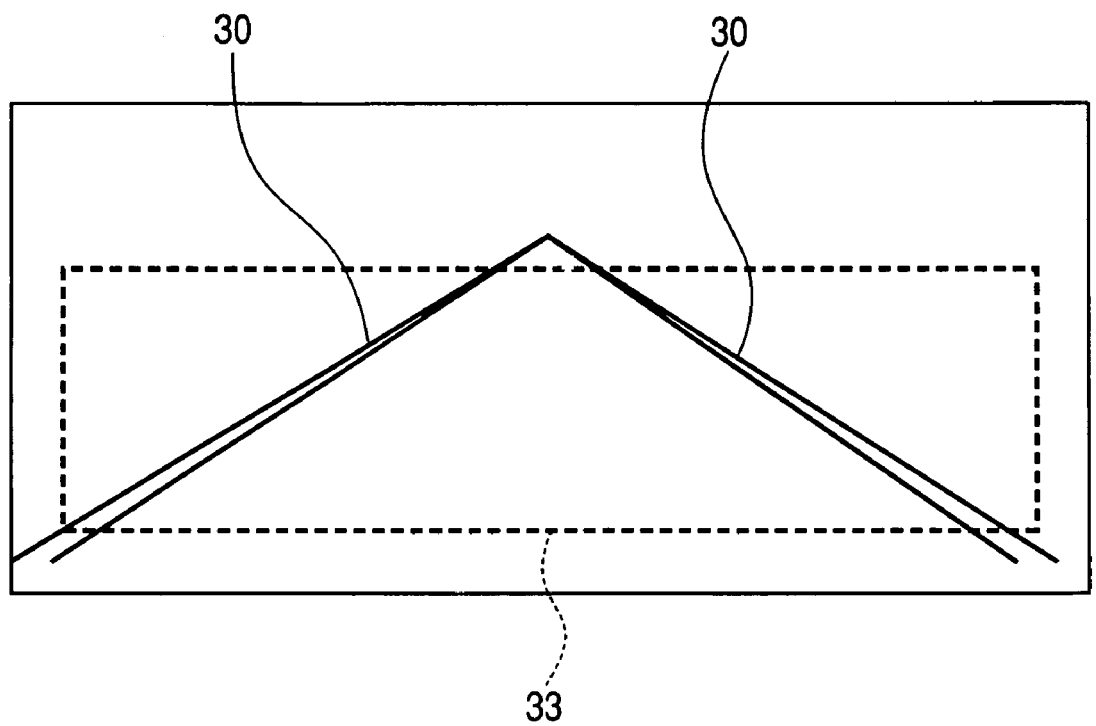
FIG. 18 is a diagram for use in describing how a brightness measurement region can be freely determined while avoiding the problem shown in FIG. 17, by the present invention.

As can be understood from the above, with the exposure control apparatus 10 of this embodiment, even if the brightness measurement region contains exceptionally bright areas such as white lines (lane markers) or dark areas (repaired portions formed of coal tar, etc.) on the road surface, disturbance effects of these are suppressed, so that the brightness of a required area ahead of the vehicle can be reliably measured. The brightness measurement region in a captured image can thereby be established with greater freedom than is possible for example with the prior art method described hereinabove referring to FIG. 17. That is to say, even if the local vehicle moves laterally with respect to its direction of forward travel, so that a white line on the road surface enters the brightness measurement region, it is ensured that exposure control will be unaffected by this, since the high brightness values corresponding to such a white line are automatically excluded from the brightness evaluation processing, as described above referring to FIG. 9.

Moreover with the exposure control apparatus 10 of this embodiment, since the amount of picture element values that are excluded is increased in accordance with degree of closeness of the corresponding area of the road, appropriate exclusion of high-brightness and low-brightness values can be achieved.

Furthermore with the exposure control apparatus 10 of this embodiment, after performing time-axis averaging filtering of respective (spatial-domain) average values obtained for the picture lines of the brightness measurement region, time-axis filtering is selectively applied to the individual picture lines. In doing this, the strength of filtering (i.e., degree of smoothing of variations of successively obtained average brightness values of the picture line) is increased in accordance with increasing distance of the region represented by the picture lines. As a result, time-axis variations of the average brightness values obtained for the respective lines, which tend to increase in accordance with the distance of the region represented by the picture lines, can be reduced. Thus more appropriate exposure control can be achieved.

Other Embodiments

The invention is not limited to the embodiment described above, and various modifications or alternative embodiments could be envisaged which lie within the scope claimed for the invention.

With the above embodiment the exposure control apparatus 10 sorts the converted brightness values of the picture elements of picture lines of the brightness measurement region respectively separately for each of the picture lines, and excludes respective fixed pluralities of the highest-brightness picture elements and lowest-brightness picture elements from each picture line of the brightness measurement region.

However the invention is not limited to this. It would be possible to sort the picture element values obtained from the camera (i.e., luminance values) and exclude highest-luminance and lowest-luminance picture elements. Alternatively it would be possible to establish a threshold value of luminance, for use in, determining those picture elements which are to be excluded as having excessively high brightness values, and similarly, a threshold value could be established for determining those picture elements which are to be excluded as having excessively low brightness.

However the method of the above embodiment is preferable since, irrespective of the actual brightness values of each scan line, capture-objective brightness values can be derived with stability, since calculation of the (spatial-domain) average brightness of the brightness measurement region is always based on a fixedly predetermined number of picture elements.

Furthermore it should be noted that it is not necessary that the respective pluralities of the highest-brightness and lowest-brightness picture elements that are omitted from a picture line be made equal. It would be possible to make the number of lowest-brightness picture elements which are excluded smaller than the number of highest-brightness picture elements, or to exclude only a predetermined plurality of the highest-brightness picture elements, without excluding any of the lowest-brightness values.

Furthermore, the invention is not limited to excluding the brightest and darkest values on a line-by-line basis. It would be equally possible for example to perform the exclusion based upon the overall distribution of picture element brightness values within the brightness measurement region.

Moreover, although the above embodiment has been described for application to a system for performing warning indication processing and steering control processing based upon recognition of a preceding vehicle, the invention is not limited to such a system, and could for example be applied to a system for performing warning indication processing and steering control processing, etc., based upon recognition of white lines (traffic lane markers) formed on a road surface.

Furthermore, the brightness measurement region of the above embodiment is described only as an example, and an appropriate form of brightness measurement region can be configured in accordance with the requirements of a particular system.

What is claimed is:

1. An exposure control apparatus for exposure control of an electronic digital camera installed on a vehicle, said camera disposed to periodically capture respective images of an external scene ahead of said vehicle, each of said images comprising an array of picture elements having respective luminance values, and said exposure control apparatus comprising circuitry configured to convert said luminance values to corresponding brightness values of said external scene in accordance with a predetermined relationship between an exposure condition of said camera, said luminance values and said brightness values;

wherein said exposure control apparatus comprises:
extraction circuitry configured to extract from each of said images a plurality of picture lines each comprising a horizontal row of picture elements, said plurality of picture lines constituting a brightness measurement region;
exclusion circuitry configured
to select, from each of said picture lines, a fixed number of high-brightness picture elements having respective brightness values successively decreasing from a highest brightness value of said picture line, and a fixed number of low-brightness picture elements having respective brightness values successively increasing from a lowest brightness value of said picture line, and
to exclude said fixed number of high-brightness picture elements and said fixed number of low-brightness picture elements from said brightness measurement region, said exclusion being performed separately for each of said respective picture lines;
measurement circuitry configured to measure a capture-objective brightness value of said image, based upon respective brightness values of remaining picture elements of said brightness measurement region following said exclusion of high-brightness picture elements and low-brightness picture elements; and
exposure control circuitry configured to adjust said camera exposure condition in accordance with said capture-objective brightness value.

2. An exposure control apparatus as claimed in claim 1, wherein said exclusion circuitry is configured to successively increase respective numbers of picture elements excluded from said picture lines of the brightness measurement region, in accordance with increasing closeness to said vehicle of external regions corresponding to said picture lines.

3. An exposure control apparatus as claimed in claim 2, wherein said measurement circuitry is configured to process each picture line of said brightness measurement region by:
calculating and storing an average brightness value of all non-excluded picture elements of said picture line, thereby obtaining for said picture line a plurality of average brightness values respectively corresponding to successive time points, and
performing time-axis filtering of said plurality of average values, to obtain a filtered average brightness value,
and wherein said measurement circuitry is configured to derive said capture-objective brightness value based upon respective filtered average brightness values calculated for said picture lines of said brightness measurement region, and
a smoothing effect of said time-axis filtering is increased in accordance with increasing distance of external regions corresponding to said picture lines.

4. An exposure control program, stored in a memory of a computer, to be executed by said computer, for implementing respective functions of an exposure control apparatus for exposure control of an electronic digital camera installed on a vehicle, said camera disposed to periodically capture images of a scene ahead of said vehicle, each image comprising an array of picture elements having respective luminance values, and said exposure control apparatus comprising means for converting said luminance values to corresponding brightness values of said scene in accordance with an exposure condition of said camera, the functions of the exposure control apparatus comprising:
an extraction step for extracting from each of said images a plurality of picture lines, each comprising a horizontal row of picture elements, said plurality of picture lines constituting of a brightness measurement region;
an exclusion step for
selecting, from each of said picture lines, a fixed number of high-brightness picture elements having respective brightness values successively decreasing from a highest brightness value of said picture line, and a fixed number of low-brightness picture elements having respective brightness values successively increasing from a lowest brightness value of said picture line, and excluding said fixed number of high-brightness picture elements and said fixed number of low-brightness picture elements from said brightness measurement region, said exclusion being performed separately for each of said respective picture lines;

a measurement step for measuring a capture-objective brightness value, based upon respective brightness values of remaining picture elements of said brightness measurement region following said exclusion of high-brightness picture elements and low-brightness picture elements; and an exposure control step for adjusting said exposure condition of the camera in accordance with said capture-objective brightness value.

5. An exposure control apparatus for exposure control of an electronic digital camera installed on a vehicle, said camera disposed to periodically capture respective images of an external scene ahead of said vehicle, each of said images comprising an array of picture elements having respective luminance values, and said exposure control apparatus comprising circuitry configured to convert said luminance values to corresponding brightness values of said external scene in accordance with a predetermined relationship between an exposure condition of said camera, said luminance values and said brightness values, wherein said exposure control apparatus comprises:

extraction circuitry configured to extract from each of said images a plurality of picture elements constituting a brightness measurement region;

exclusion circuitry configured to exclude a set of highest-brightness picture elements of said brightness measurement region;

measurement circuitry configured to measure a capture-objective brightness value of said image, based upon respective brightness values of remaining picture elements of said brightness measurement region following said exclusion; and exposure control circuitry configured to adjust said camera exposure condition in accordance with said capture-objective brightness value, wherein said extraction circuitry is configured to extract said picture elements of said brightness measurement region in units of picture lines, each comprising a horizontal row of picture elements, wherein said exclusion circuitry is configured to perform said exclusion of picture elements respectively separately for each of said picture lines, wherein said exclusion circuitry is configured to successively increase respective numbers of picture elements excluded from said picture lines of the brightness measurement region, in accordance with increasing closeness to said vehicle of external regions corresponding to said picture lines, wherein said measurement circuitry is configured to process each picture line of said brightness measurement region by:

calculating and storing an average brightness value of all non-excluded picture elements of said picture line, thereby obtaining for said picture line a plurality of average brightness values respectively corresponding to successive time points, and performing time-axis filtering of said plurality of average values, to obtain a filtered average brightness value, wherein said measurement circuitry is configured to derive said capture-objective brightness value based upon respective filtered average brightness values calculated for said picture lines of said brightness measurement region, and wherein a smoothing effect of said time-axis filtering is increased in accordance with increasing distance of external regions corresponding to said picture lines.

6. An exposure control apparatus as claimed in claim 5, wherein said set of excluded highest-brightness picture elements comprises a predetermined number of picture elements.

7. An exposure control apparatus as claimed in claim 5, wherein said exclusion circuitry is configured to exclude a set of lowest-brightness picture elements of said brightness measurement region.

8. An exposure control apparatus as claimed in claim 5, wherein said excluded set of lowest-brightness picture elements comprises a predetermined number of picture elements.

* * * * *